United States Patent [19]

Becker et al.

[11] Patent Number: 5,623,590
[45] Date of Patent: Apr. 22, 1997

[54] DYNAMIC GRAPHICS ARRANGEMENT FOR DISPLAYING SPATIAL-TIME-SERIES DATA

[75] Inventors: Richard A. Becker, Watchung; Stephen G. Eick, Edison; Eileen O. Miller, Short Hills; Allan R. Wilks, Scotch Plains, all of N.J.

[73] Assignee: Lucent Technologies Inc., Murray Hill, N.J.

[21] Appl. No.: 125,612

[22] Filed: Sep. 7, 1993

Related U.S. Application Data

[63] Continuation of Ser. No. 390,549, Aug. 7, 1989, abandoned.

[51] Int. Cl.[6] .................................................. G06F 3/14
[52] U.S. Cl. ......................... 395/326; 395/140; 395/348; 379/136
[58] Field of Search ................................... 395/161, 140, 395/159, 155, 160; 379/136, 137, 133, 122; 345/140

[56] References Cited

U.S. PATENT DOCUMENTS

| | | | |
|---|---|---|---|
| 3,815,986 | 6/1974 | Darbee | 355/1 |
| 4,455,455 | 6/1984 | Little | 379/203 |
| 4,456,788 | 6/1984 | Kline et al. | 379/137 |
| 4,675,147 | 6/1987 | Schaefer et al. | 395/140 X |
| 4,675,832 | 6/1987 | Robinson et al. | 395/141 |
| 4,730,262 | 3/1988 | Watanabe et al. | 395/140 |
| 4,775,973 | 10/1988 | Tomberlin et al. | 379/136 X |
| 4,796,019 | 1/1989 | Auerbach | 345/169 |
| 4,811,240 | 3/1989 | Ballou et al. | 395/155 |
| 4,845,645 | 7/1989 | Matin et al. | 395/155 X |
| 4,847,785 | 7/1989 | Stephens | 395/140 |
| 4,885,575 | 12/1989 | Williams | 345/173 |
| 5,016,170 | 5/1991 | Pollalis et al. | 395/161 X |
| 5,136,690 | 8/1992 | Becker et al. | 395/161 |
| 5,270,919 | 12/1993 | Blake et al. | 379/136 X |

OTHER PUBLICATIONS

*Op. Res. Q.* (GB), vol. 21, Spec. 161,1971, "Linmap and Colmap: A Computer Mapping System", G.M. Gaits, p. 161.
*Fifth Annual Simulation Symposium*, vol. 2, 1971, Tampa, Fla., "Simulation of Airport Traffic Flows . . . ", F.P. Testa et al, pp. 143–163.
*Proc. of International Conf., Analysing Time Series*, Guernsey, Channel Islands, Oct. 1979, "Analysis and Modeling of Time Series Via Interactive . . . ", N.W. Polhemus, pp. 239–267.
*AT&T Technical Journal*, May/Jun. 1987, vol. 66, Issue 3, "Asquic 800 Call Data Master", M. R. Braunstein, et al, pp. 21–31.

Primary Examiner—Raymond J. Bayerl
Attorney, Agent, or Firm—Frederick B. Luludis

[57] ABSTRACT

A computer is provided with the facility to display in map form spatially-time-varying data associated with respective nodes. Specifically, responsive to a user inputting a specific command, the computer displays a plurality of symbols representing respective ones of the nodes in which the symbols share a common characteristic, the size of which is varied commensurate with changes in the data associated with their respective nodes. In addition, the user is provided with a tool so that he/she may either manually or automatically play through the data. The user is also provided with a number of other tools to control the display of the symbols and/or data, such as, for example, a tool which changes the size of the symbols so that smaller symbols are not obscured by larger symbols.

23 Claims, 24 Drawing Sheets

FIG. 16

| FIG. 17 |
|---------|
| FIG. 18 |
| FIG. 19 |
| FIG. 20 |
| FIG. 21 |
| FIG. 22 |
| FIG. 23 |
| FIG. 24 |

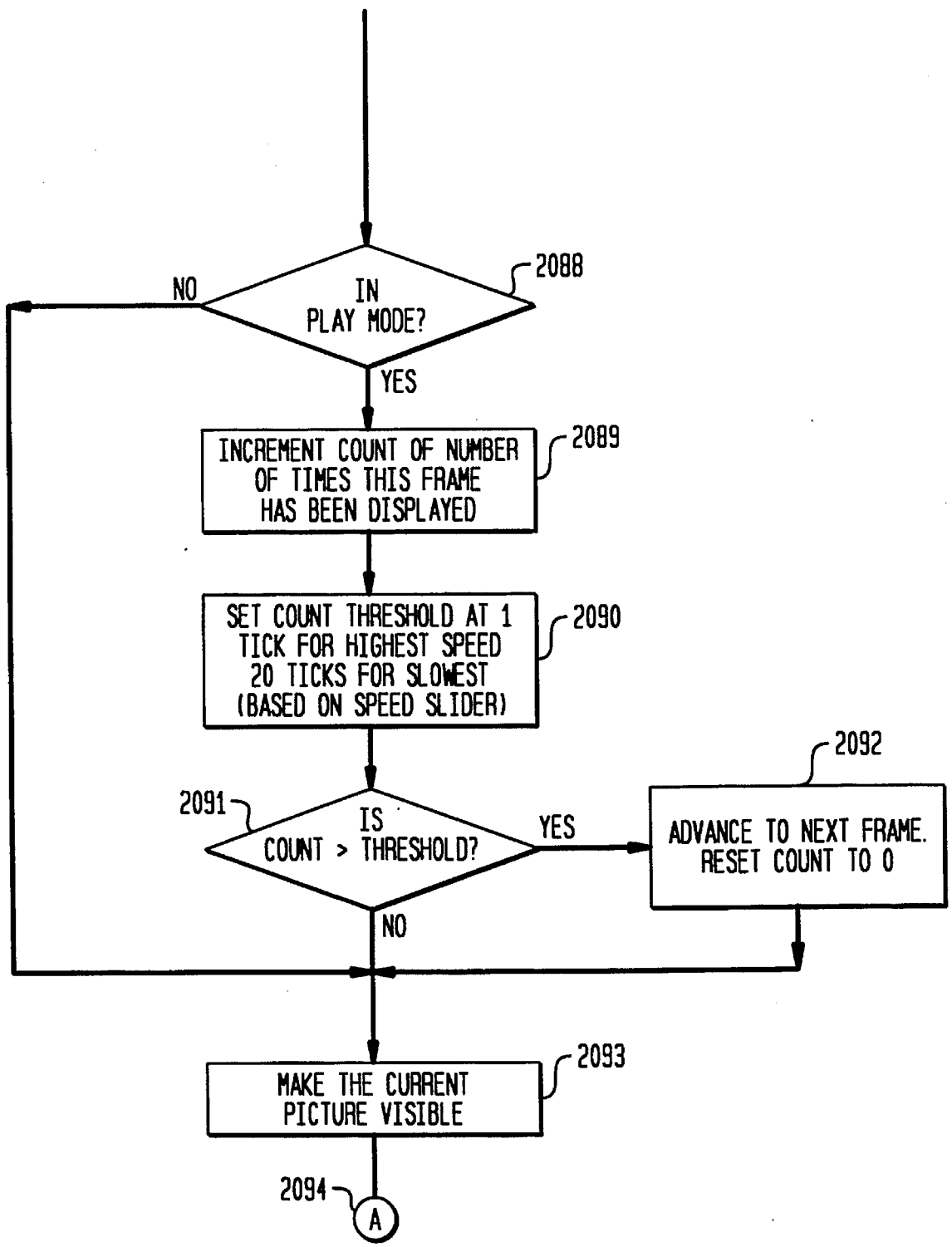

5,623,590

DYNAMIC GRAPHICS ARRANGEMENT FOR DISPLAYING SPATIAL-TIME-SERIES DATA

This application is a continuation of U.S. patent application Ser. No. 07/390,549, filed on Aug. 7, 1989, now abandoned.

FIELD OF THE INVENTION

The invention relates to dynamic graphic arrangements and more particularly to an arrangement which displays in map form time varying data associated with a plurality of nodes.

BACKGROUND OF THE INVENTION

Spatial-Time-Series data involves time-varying statistics associated with data sources called nodes having a spaced-apart relationship with one another. In communications networks, a node could be a switching office and the data could be the level of incoming and outgoing traffic for each five minute interval in a day. In other situations, a node could be a financial entity, (e.g., a bank) and the data could be the level of incoming and outgoing financial transactions for consecutive days. To analyze spatial-time-varying data, an analyst may employ a graph or map, in which symbols, for example, bars, are used to encode the level of the data at respective nodes for each time period. However, an analyst may be reluctant to use a map to analyze such data when the amount of data is large, which is usually the case when the number of nodes is large and/or the data is time-varying. The reason for such reluctance is that it would be an onerous task to interpret time-varying data.

SUMMARY OF THE INVENTION

The problem associated with mapping a large amount of spatial-time-varying data is dealt with by displaying such maps on a display, such as a computer display, and allowing a user to control, in accordance with the invention, the rate at which time-varying data is displayed. In this way, the user may display data corresponding to a single period of time (a still picture), or may display succeeding periods of time at a desired rate, thereby producing a time sequence (moving picture) effect as the corresponding data is displayed through time.

In particular, each source of data (node) is represented by a displayed symbol, in which particular characteristics of the symbol are used to represent the magnitude of the data at the respective source. For example, the symbol may be a rectangle, in which the width and height thereof may represent the magnitudes of incoming and outgoing data, respectively. Thus, a change in the level of incoming (outgoing) data is reflected in a like change in the width (height) of the rectangle. In addition, the symbols may be assigned one of a number of different colors based on the characteristics of the corresponding data. For example, a particular symbol may be painted red to illustrate that the magnitude of the incoming data exceeds the magnitude of the outgoing data. Conversely, the symbol may be painted green to illustrate the opposite case.

BRIEF DESCRIPTION OF THE DRAWING

These and other objects and features, together with the operation and utilization of the present invention will be more apparent from the illustrative embodiment shown in conjunction with the drawings in which:

FIG. 16 shows the manner in which FIGS. 17 through 24 should be arranged; and

FIGS. 17 through 24 are flow charts of the program which implements the invention in the computer of FIG. 1.

DETAILED DESCRIPTION

Figure 1:
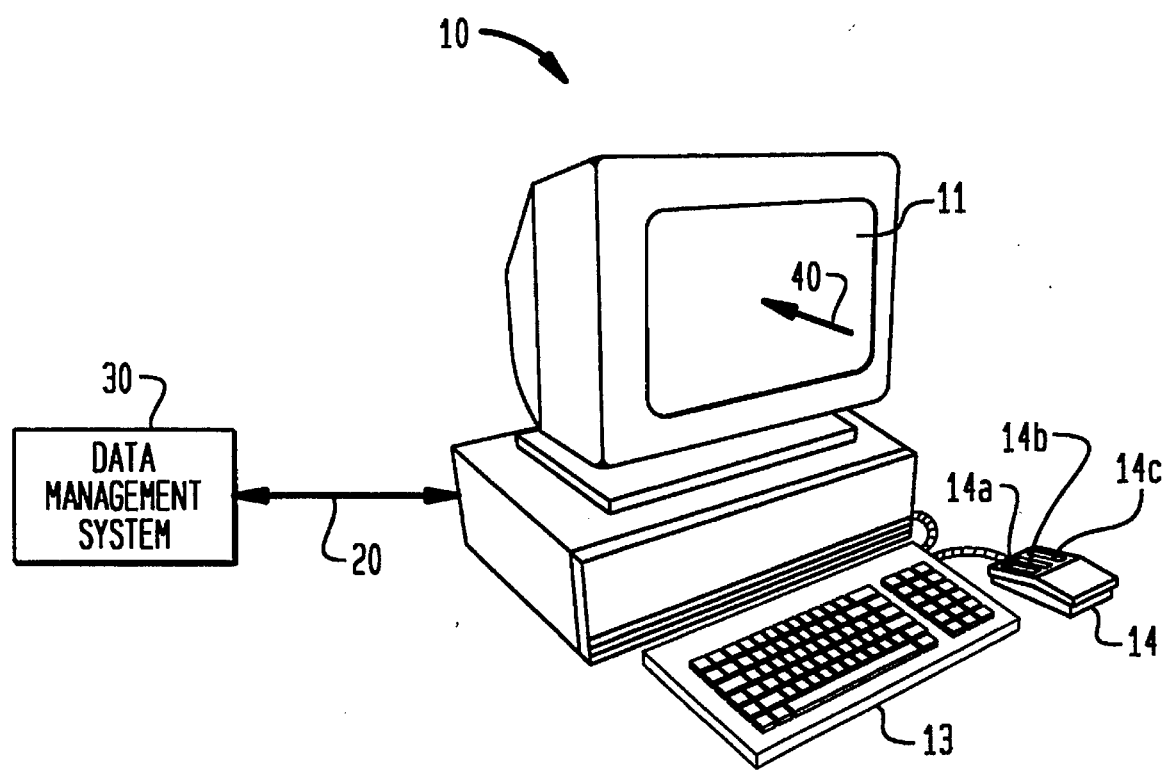
FIG. 1 is broad block diagram of a computer arrangement in which the present invention is illustratively implemented.

Computer 10 depicted in FIG. 1 operates under a predetermined operating system-illustratively the UNIX operating system. Computer 10, which may be, for example, the IRIS Workstation available from Silicon Graphics, Inc. of Mountain View, Calif., includes a screen 11, keyboard 13 and mouse 14 as well as other internal components not explicitly shown in the Figure, such as a hardisk drive. The keyboard and mouse, more particularly, provide a mechanism for the user to input information and instructions to the computer. For example, the user may invoke a particular task identified on the screen by operating the displayed mouse 14 in a conventional manner to cause mouse cursor 40 to point at that task. The user may then invoke the task by operating a respective one of the mouse keys, or buttons, 14a through 14e, as will be discussed below.

Associated with computer 10 is a communications link 20 which allows computer 10 to communicate with central data management system 30. Central data management system 30 is of the type which, from time to time, polls a plurality of network nodes, one by one, to collect specific data relating to their operation. In contemplation of the invention, such network nodes could be, for example, airline terminals, or airports, in which the collected data could relate to passengers carried, average delays, etc.; banks, in which the collected data could relate to financial transactions; telephone switching centers, in which the collected data could relate to telephone calls; and so on. Such data could also be so-called long-term data relating to, for example, population patterns. After such data has been collected, computer 10 may obtain from computer 30 via line 20 a copy of the collected data for display on screen 11.

Of the above-mentioned sources of time varying data, we have found that telephone switching centers collect a considerable amount of data relating to the telephone calls that they process over the course of a day. Accordingly, the following discusses the invention in the context of a particular network—illustratively a telephone network—, such as the AT&T public switched network. As is well-known, the AT&T network comprises a plurality of network nodes, or switching centers. In the AT&T network, each such switching center is arranged to accumulate statististics on the telephone calls that it processes over each five minute interval. The statistics include, inter alia, the number of call attempts, ("peg"). The switching centers are also arranged to supply the statistics to central data management system 30, thereby making a copy of the statistics available to computer 10 for display on screen 11, as will now be discussed.

In particular, the data that computer 10 collects from data management system 30 is identified by the day of the year that the switching centers had accumulated the data, and is stored in similarly named directories contained in the memory of computer 10. After computer 10 is turned on and has performed some initial tasks, including the "booting" of the operating system from the computer 10 hard disk unit, computer 10 displays the well-known Unix system prompt. To access data which has been accumulated on a specific date, the user enters via keyboard 13 a command to access a particular data directory, that is, the user enters "cd" followed by the corresponding date. In the present illustrative example, it is assumed that the user desires to analyze particular data accumulated on November 18. Accordingly, the user enters via keyboard 13 the following command:

cd November18

On the next Unix system prompt, the user enters via keyboard 13 the letter "S" to initiate processing of the well-known S language software. (In a preferred embodiment of the invention, the S language is used for internal database management. The S language is disclosed in the text titled *The New S language,* authored by R. A. Becker, J. M. Chambers and A. R. Wilks, and published by Wadsworth & Brooks/Cole, Pacific Grove, Calif. (1988).)

In the present illustrative example of the invention, it is assumed that the user desires a map displaying the data relating to the number of call attempts (peg). It is to be understood, of course, that the following discussion pertains equally well to the other categories of statistics, as will be made clear from the following discussion. Accordingly, to select data, or statistics, relating to the number of call attempts that the nodes accumulated over the selected date, the user next enters via keyboard 13 the following command:

nodemap(peg)

Figure 2:
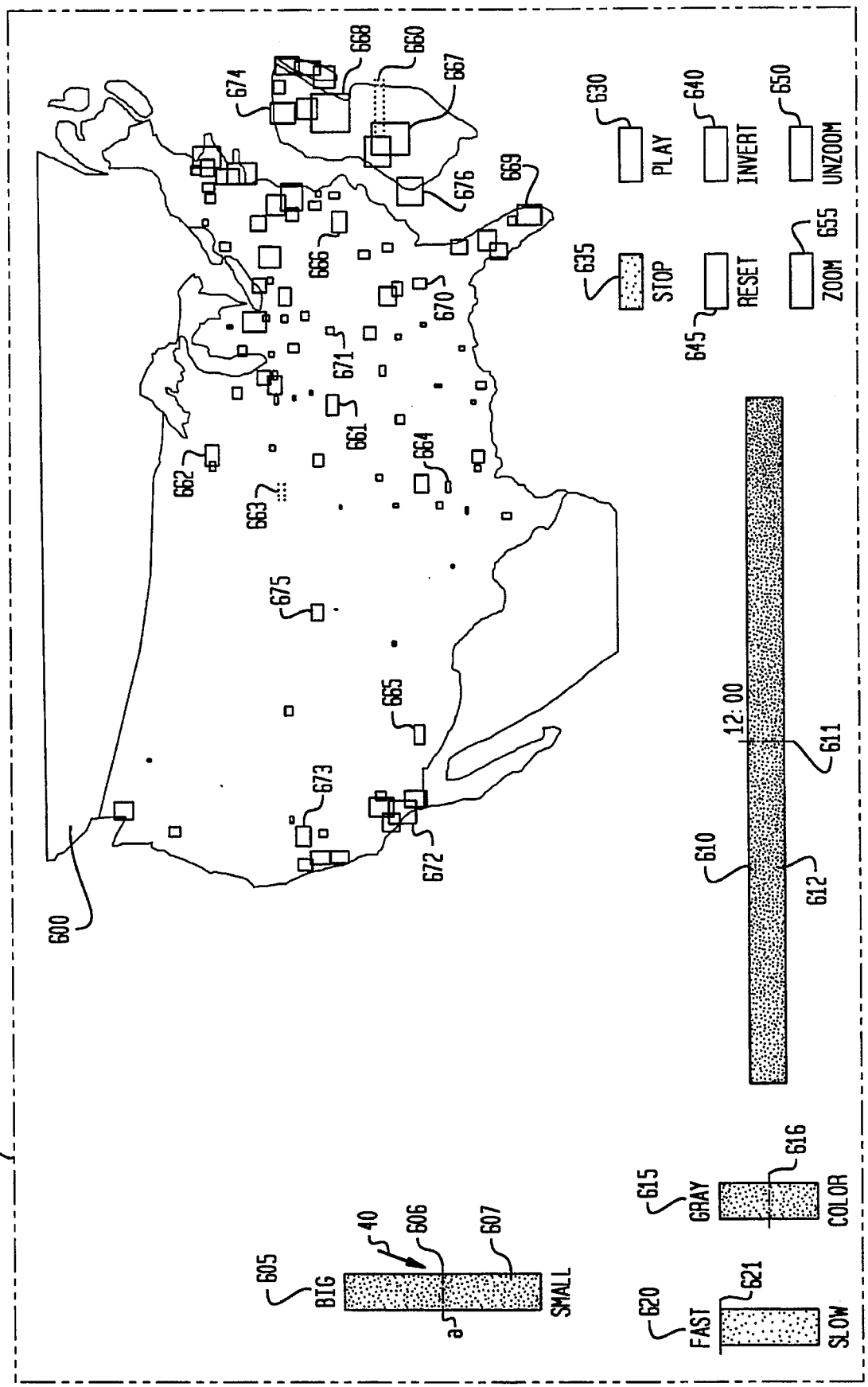
FIGS. 2 through 15 show various stages of time-varying data displayed in map form by the computer of FIG. 1 in which display parameters may be changed using a respective displayed tool in accordance with the principles of the invention.

Computer 10 responsive to the latter command unloads from its memory the pertinent data and displays the data in the form of a map, as shown in FIG. 2.

In displaying map 600 on screen 11, computer 10 paints an outline of the U.S. (including portions of Canada and Mexico) and then displays within that outline the various network nodes positioned at their respective locations within the U.S., in which each node is represented by a particular symbol—illustratively a rectangle. (It is noted that the area comprising the State of New Jersey, Southern region of New York and Eastern region of Pennsylvania is shown detached from the mainland of the U.S.A.)

In accordance with an aspect of the invention, particular characteristics of the displayed symbols—illustratively width and height—are used to identify the level and direction of data at a node. For example, the width and height of a symbol are proportional to the level of its associated incoming and outgoing data, respectively. Thus, generally, a displayed symbol whose width exceeds its height means that the number of call attempts into the associated node exceeds the number of call attempts out of the node, as represented by, for example, nodes 660 through 666. In the opposite case, i.e, in the instance where the height of a symbol exceeds its width, then the number of call attempts out of the associated node exceeds the number of call attempts into the node, as represented by, for example, nodes 667 through 672. It can be appreciated that the shape of a symbol is approximately square when the level of incoming and outgoing data at the associated node is approximately the same, as represented by, for example, nodes 673 through 676.

In bringing up map 600 on screen 11, computer 10 displays the symbol for each node for a particular time period using the data that had been accumulated by each of the network nodes over a range of times of the priorly selected date. That is, computer 10 initially uses a default time period in bringing up map 600, in which the default time period is set to, for example, 12:00 o'clock noon of the selected date. Thus, computer 10 uses the data that had been accumulated by each network node over the period of time defined by 12:00 noon to 12:05 P.M. to set the respective aspect ratios between the width and height of the respective displayed symbols. As will be seen below, the user is allowed to vary the time associated with the displayed symbols and thus observe changes in the symbols themselves.

As another aspect of our invention, a symbol is painted one of a number of predetermined colors to provide a visual indication of the degree to which incoming data exceeds outgoing data, and vice-versa. For example, if the width of a symbol exceeds its height by more than a certain percentage, then the symbol is painted—illustratively red. For the opposite case the symbol is painted—illustratively green. In the case where the height and width of a symbol are substantially equal, then the symbol is painted—illustratively gray. (As will be discussed below, the user may "tune" the sensitivity of the color coding using color control 615.)

In addition, in accordance with an aspect of the invention, the user may operate time scale tool 610 to display time-varying data accumulated by the network nodes during another period of time of the priorly selected date, as will be discussed below in detail. Briefly, the user may change the displayed data by positioning mouse cursor 40 at slider bar 611, depressing mouse button 14a, and moving cursor 40 to either the left or right in the conventional manner. If the user moves slider bar 611 to the right (left), then the time of day increases (decreases). The time of day represented by the current position of slider 611 on scale 612 is displayed at the top and to the right of slider 611, in the manner shown for 12:00 o'clock. Thus, when the user moves slider bar 611 either to the left or right, computer 10 erases the symbols from screen 11 and redraws them so that their width and height are commensurate with the level of the incoming and outgoing data accumulated by their respective nodes at the time defined by the current position of slider 611 on time scale 612.

(Hereinafter the term "points to" and the variants of that term will be taken to mean the action of moving mouse screen cursor 40 to an object or symbol displayed on screen 11, and is meant to include other terms that are understood by the art and which define similar functions. For example, it includes moving a screen cursor to the location of displayed text or to an entry in a menu of displayed entries (items) and operating, for example, an enter key; "touching" a touch sensitive panel overlaying screen 11; or even identifying particular displayed text or a menu of entries using terminal buttons, for example, computer keyboard buttons.)

Computer 10 also paints on screen 11 a number of other tools which the user may operate to control, in accordance with an aspect of the invention, other parameters employed by computer 10 in the display of time varying data. In particular, the user may operate slider bar 606 of Size tool 605 to adjust both the width and height of the displayed symbols so that overlapping symbols to do not obscure one another, as will be discussed below in detail. As mentioned above, the user may adjust the sensitivity of the color coding of the symbols by operating color tool 615, as will be discussed in more detail below. In addition, the user may operate slider bar 621 of rate tool 620 to adjust the rate at which computer 10 cycles through time periods, as will be discussed below.

Displayed in the lower, right-hand corner of map 600 are six additional tools that the user may employ to analyze map 600. Specifically, play tool 630 is used to invoke a "Play" mode. Briefly, in the Play mode, slider bar 611 automatically advances through time scale 612, thereby causing computer 10 to "play through" the stored data accumulated for the selected date. As such, the play mode provides an animated effect in which the width and height of the displayed symbols increase and decrease commensurate with the changes in the level of the incoming and outgoing data at their respective nodes and times. The user may stop the Play mode by pointing to "Stop" tool 635 while operating mouse button 14a. It is noted that Stop tool 635 is used as a default mode and is displayed in the color of red when map 600 is first brought up on screen 11.

The user may deactivate the nodes represented by the displayed symbols by pointing to "Invert" tool 640. In that instance, computer 10 displays in place of each symbol a somewhat diamond-shaped symbol displayed in color of cyan to note that the symbols, or nodes, have been deactivated. As an aspect of the invention, the user may employ cursor 40 as a "brush" to reactivate a deactivated node. That is, when the user points to a deactivated node and presses mouse button 14a, then computer 10 replaces the associated symbol with the node's original, or activated symbol, as will be shown below. The user may, at any time, undo the "Invert" mode and redisplay all of the symbols in map 600 by simply pointing to "Reset" Cool 645 and operating mouse button 14a.

In addition, the user is provided with the capability to magnify a particular area of map 600. The user magnifies an area of map 600 simply by (a) pointing to "Zoom" tool 655 and operating mouse button 14a; (b) then pointing to one corner of the area to be magnified, for example, the upper left-hand corner and pressing mouse button 14a; and (c) then moving the mouse cursor to the diagonally opposite corner (for example, the lower right-hand corner) thereof and releasing mouse button 14a. Thereafter, the user may restore the magnified area to its original displayed size by pointing to "Unzoom" tool 650 and operating button 14a.

The user is also provided with several other tools not explicitly shown in the FIG. For example, the user may deactivate one or more nodes by operating mouse button 14b while pointing to the nodes, one at a time. Thereafter, the user may reactivate a deactivated node by operating mouse button 14a while pointing to the node. Alternatively, the user may reactivate all deactivated nodes by operating "Reset" tool 645, as mentioned above.

Another tool not explicitly shown in the Figure allows the user to display the identity as well as the statistics of a symbol's associated node. For example, when the user points at a node, the node becomes current and its associated symbol is displayed even though the node may be inactive. The user makes a node current by pointing mouse cursor 40 within the vicinity of the pertinent node. Computer 10 continues to display such identity and statistics as long as cursor 40 remains within the vicinity of the current node.

With the foregoing in mind, we will now discuss how the user may employ the various tools described above to control the parameters that are used in displaying map 600.

To begin with, the user may employ size tool 605 in the manner discussed above to linearly increase or decrease the size (height and width) of the displayed symbols. For example, to increase the size of the displayed symbols, the user points to slider bar 606 and moves it from the default position denoted by "a" in a direction toward the top-end of scale 607 identified by the term "Big". Computer 10 responsive thereto linearly increases the size of the displayed symbols commensurate with the distance that user moves slider bar 606 on scale 607 in the aforementioned direction, as shown in FIG. 3.

Figure 3:
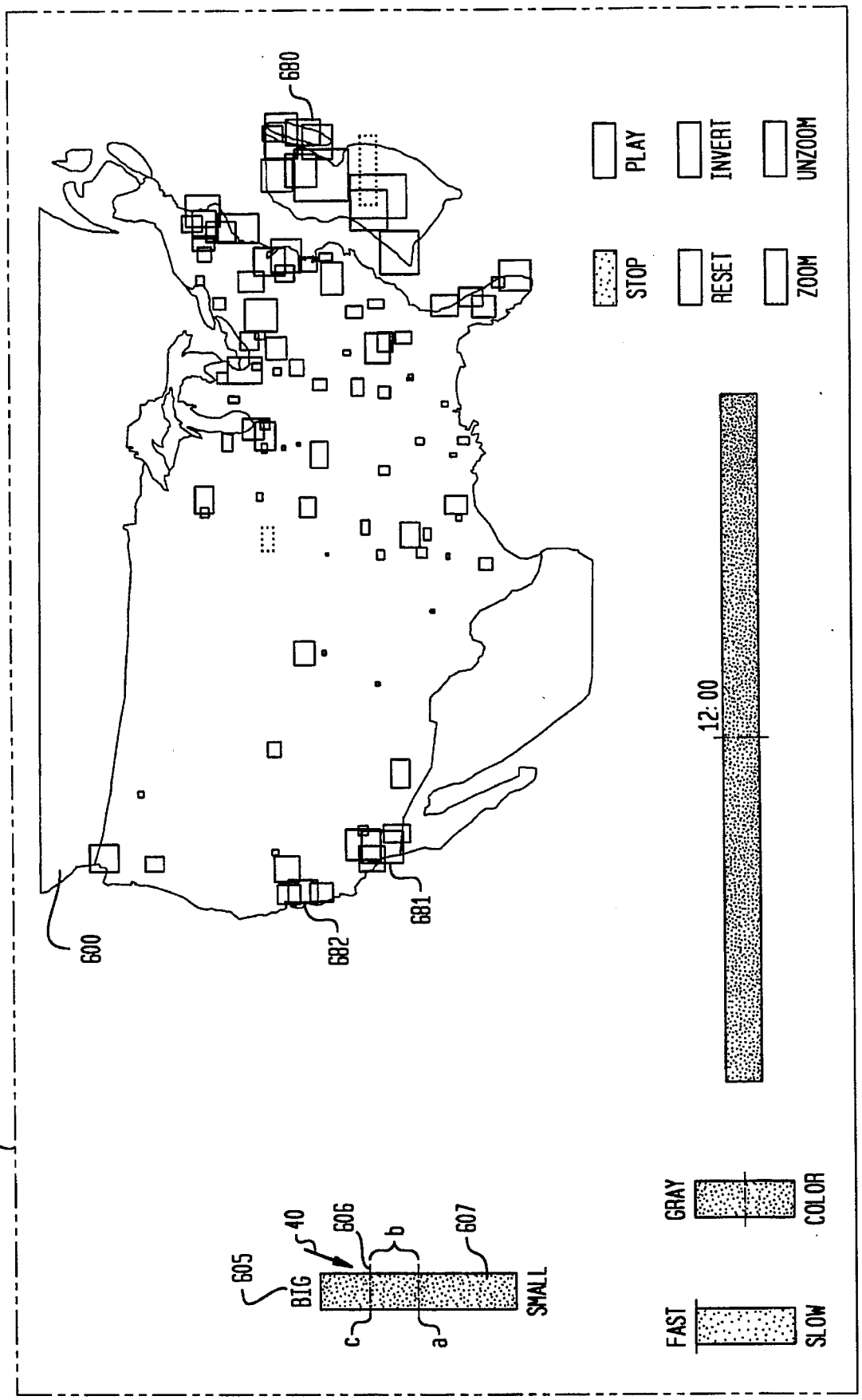

It is seen from FIG. 3, that computer 10 has proportionally increased the size (height and width) of each of the displayed symbols by an amount that is commensurate with the distance that the user has moved slider bar 606, which in the present example, is the distance "b" as measured from point "a" to point "c" on scale 607. Note, however, that as a result of the increasing the size of the displayed symbols, the user has caused the smaller symbols located generally at 680, 681 and 682 to be obscured by the larger symbols. At this point, if the user so desires, he/she may further increase the size of the symbols by moving slider bar closer to the top-end of scale 607, as shown in FIG. 4.

Figure 4:
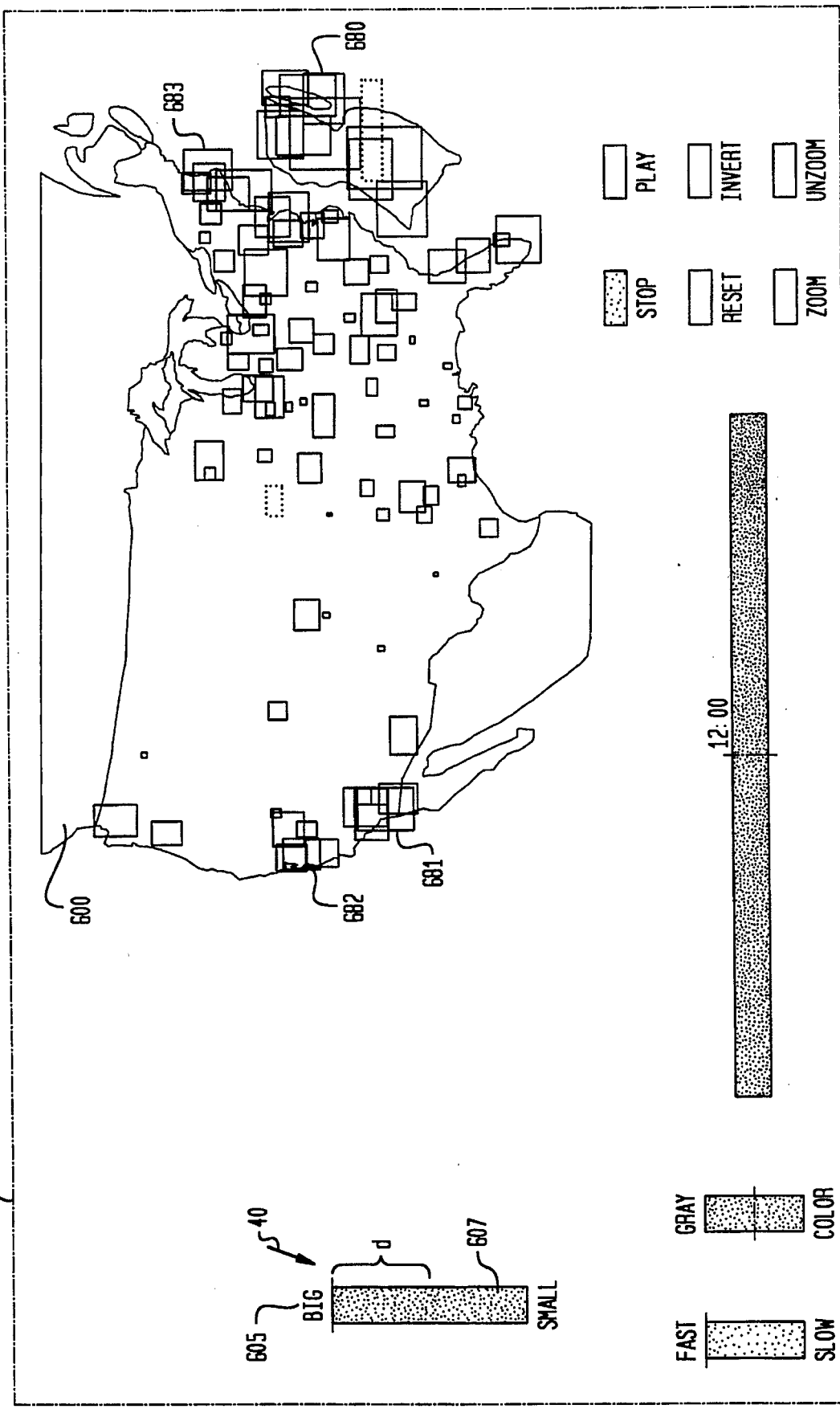

The illustrative example of FIG. 4 indicates that the user has moved slider bar 606 a distance "d" to the top end of scale 607, thereby causing computer 10 to now proportionally increase the size of each of the displayed symbols by an amount commensurate with the distance "d". However, in doing so the user has further obscured the smaller symbols located generally at 680, 681 and 682. In addition, the user has also caused other smaller displayed symbols to be obscured by larger symbols, as generally noted at, for example, 683.

Figure 5:
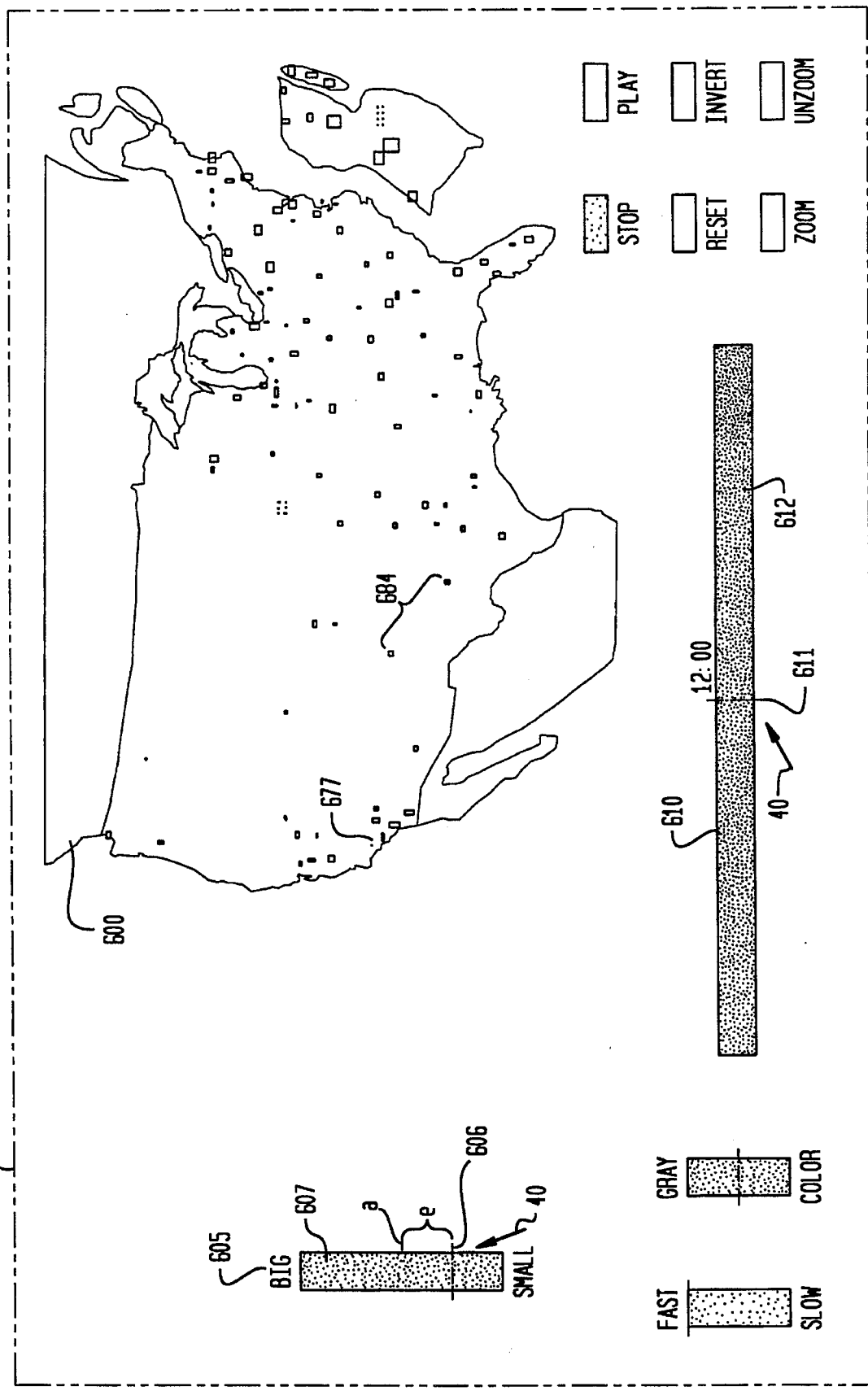

Conversely, the user may proportionally decrease the size of the displayed symbols by moving slider bar 606 toward the bottom end of scale 607, as shown in FIG. 5. (It is noted that the bottom end of scale 607 is identified by the term "Small", i.e., the "Small" end of the scale.)

It is seen from FIG. 5, that the user has moved slider bar 606 some distance "e" below the default value established at point "a" of scale 607. In turn, computer 10 has proportionally decreased the area of each of the displayed symbols by an amount commensurate with the distance "e". Although, the size of individual ones of the displayed symbols, such as, for example, the symbols collectively designated 684, have been decreased to the point where they no longer visually impart useful information, nevertheless, the user has placed map 600 in a form where it now exposes symbol, or node, 677, which had been obscured by the symbols surrounding symbol 677, as seen, for example, in FIGS. 2–4.

It is apparent from FIG. 5 that the height of symbol 677 is very close to zero, meaning that the level of data (call attempts) outputted by node 677 is very close to zero. Accordingly, the user may suspect from a visual inspection of FIG. 5 that node 677 may have stopped outputting data as the result of some possible fault. (As will be seen below, the user may expose symbol 677 using one or more of the other aforementioned tools.) Thus, in accord with an aspect of the invention, the user is provided the capability to adjust the size of the displayed symbols to expose, for example, smaller symbols which may be obscured by larger symbols.

At the heart of our invention is time scale tool 610, which had been briefly discussed above. Specifically, time scale tool 610 allows the user to "play through" the time-varying data. The user does so by pointing mouse cursor 40 at slider bar 611, depressing button 14a, and then "dragging" (moving) cursor 40 either to the left or right in the conventional manner, to increase or decrease the time of day on scale 612, respectively. When the user moves cursor 40 either to the left or right of 12:00 o'clock noon, computer 10 displays the time of day (in military time) based on the current position of slider 611 on time scale 612, as is shown in the FIG. for 12:00 o'clock. When the user does so, computer 10 changes the height and/or width of the displayed symbols commensurate with respective changes in the values of their incoming and outgoing data occurring over the five-minute interval represented by the displayed time.

Figure 6:
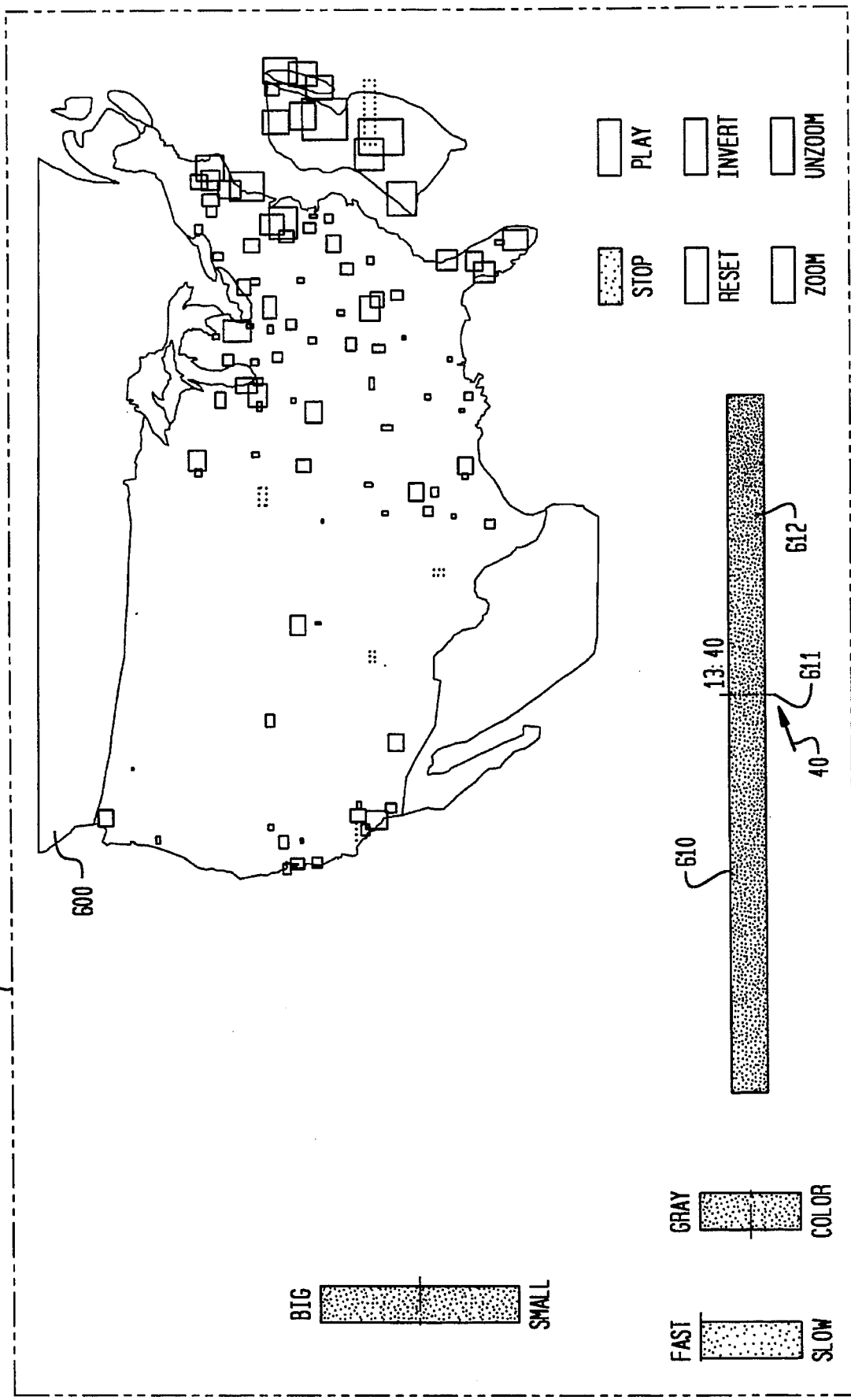

Specifically, as the user manually moves slider 611 to the right on scale 612 and stops at a point representing a time of, for example, 13:40 (1:40 P.M.), computer 10 dynamically changes in real time the height and/or width of the displayed symbols based on the statistics accumulated by their respective nodes for each five minute interval between 12:00 noon and 1:40 P.M. The last of such changes is based on the values of the statistics that the network nodes accumulated over the five-minute interval occurring between 1:35 P.M. and 1:40 P.M., as shown in FIG. 6. In comparing map 600 as it appeared in FIG. 2 with the way it now appears in FIG. 6, the user will note that the size of virtually all of the symbols representing the network nodes has increased. This is readily apparent in the Eastern half of the U.S., which is well into the business day. Also, the symbols in the Western half of the U.S. are generally smaller than those in the Eastern half. The possible reason for such a difference is that business people located in the Western half of the U.S. have gone to lunch—a period of time when telephone calling activity decreases. (Note that the displayed time is, for example, Central Standard Time (CST)).

The user may continue to play through the statistics accumulated by the network nodes over the previously selected day by manually moving slider 611 on scale 612 either further to the right or in the opposite direction, in the manner described above. As the user does so, computer 10 again changes the size of the symbols in the manner described above, and stops performing that function at the point where the user has stopped moving slider 611.

Figure 7:
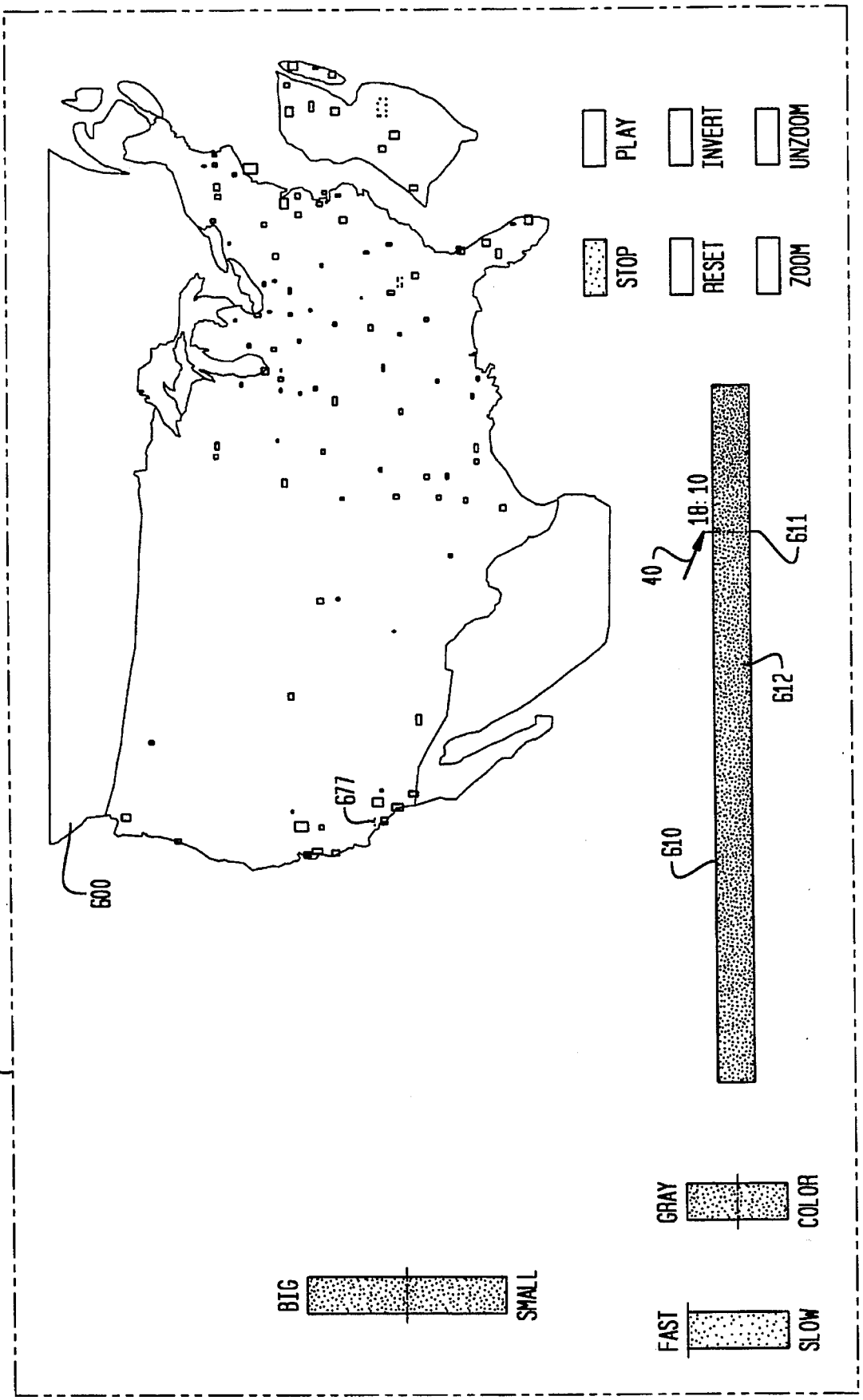

Assuming that the user stops moving slider 611 at a point on scale 612 representing 18:40 (6:40 P.M.), then computer 10 redisplays the symbols such that the size of the displayed symbols is proportional with the values of the statistics that their respective network nodes accumulated over the five-minute interval occurring between 6:35 P.M. and 6:40 P.M., as shown in FIG. 7. In visually comparing FIGS. 6 and 7, the user will note that the size of virtually all of the displayed symbols has decreased, since the number of calls processed by the network nodes over the displayed interval has decreased, as expected since the business day has ended. The user will further note that the level of outgoing data (call attempts) at node 677 is still virtually zero. As such, the user may suspect that a possible faulty condition (problem) exists at that node.

Figure 8:
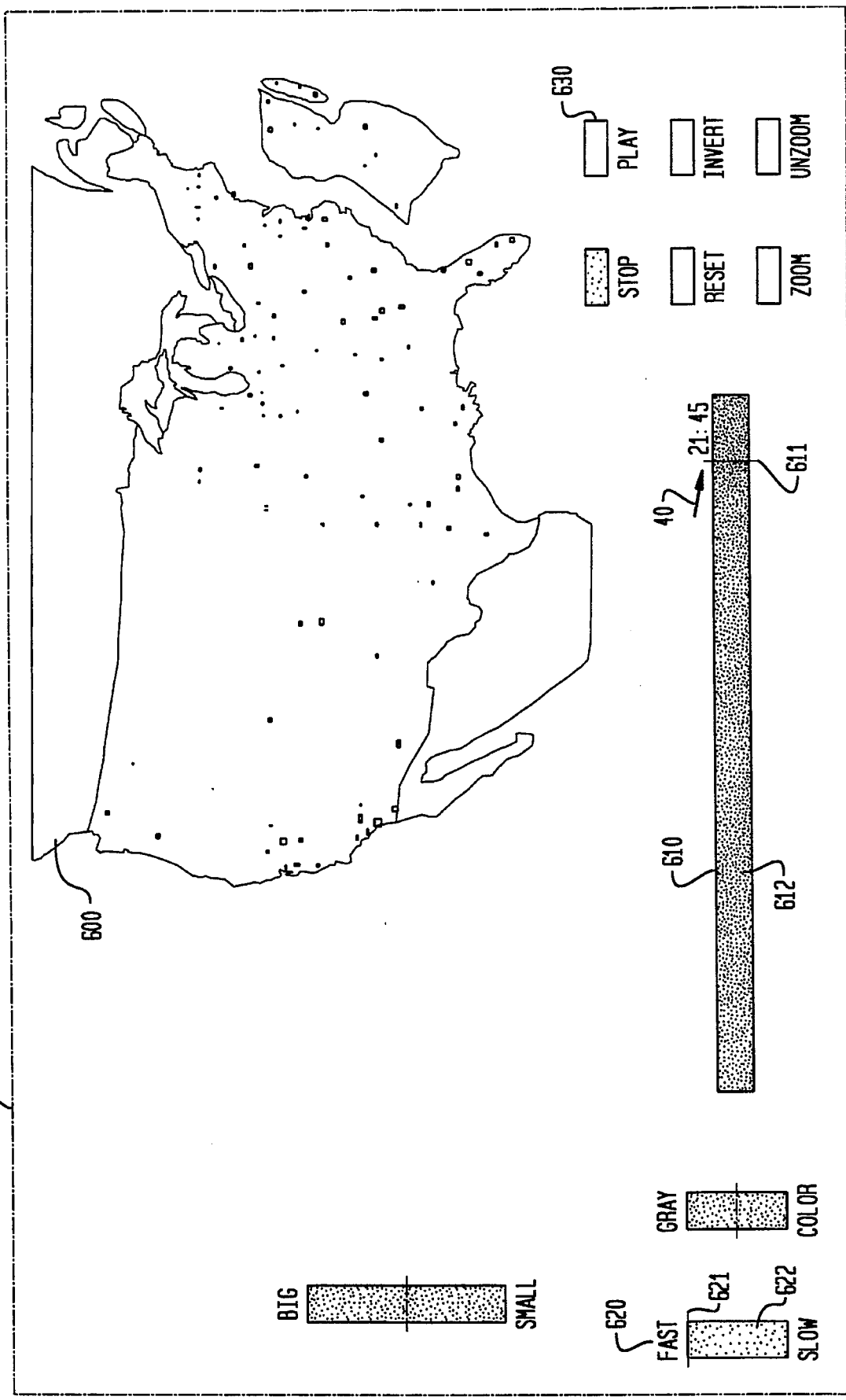

As is well-known, the level of telephone calling activity generally decreases during the later hours of the day, meaning that the level of incoming and outgoing data at each network node also decreases. Thus, if the user continues to manually move slider bar 611 to the right, then the size of each of the displayed symbols should dynamically decrease, as is shown in FIG. 8 for the time of 21:45 (8:45 P.M.).

As mentioned above, the user may cause computer 10 to automatically "play through" the stored statistics relating to call attempts for the selected day. The user does this simply by pointing to "Play" tool 630 and operating mouse button 14a. When the user does so, computer 10 automatically and continuously advances slider bar 611 through scale 612 at the rate set by rate tool 620.

For many kinds of data, such as call attempts in a communications system, the values of the time-varying data should evolve smoothly over time. Advantageously, the Play tool allows the user to rapidly display such data for each period of a sequence of successive time intervals, as is done with motion pictures, so that a smooth evolution is achieved as the sizes of the symbols are gradually increased and decreased. In this way, the user obtains an understanding of the overall smooth variations of the data values in space and time. In addition, any abrupt changes in the value of the statistic tend to catch the user's eye and stand out from the overall smooth pattern. This makes the Play tool highly advantageous in detecting anomalies in the data, such as the abrupt change in the size of a node(s).

Assuming that the user has pointed to tool 630 while operating mouse button 14a and has set slider bar 621 at the center of rate scale 622, then computer 10 automatically and continuously advances through time scale 612, in the manner discussed above and is shown in FIG. 9.

Figure 9:
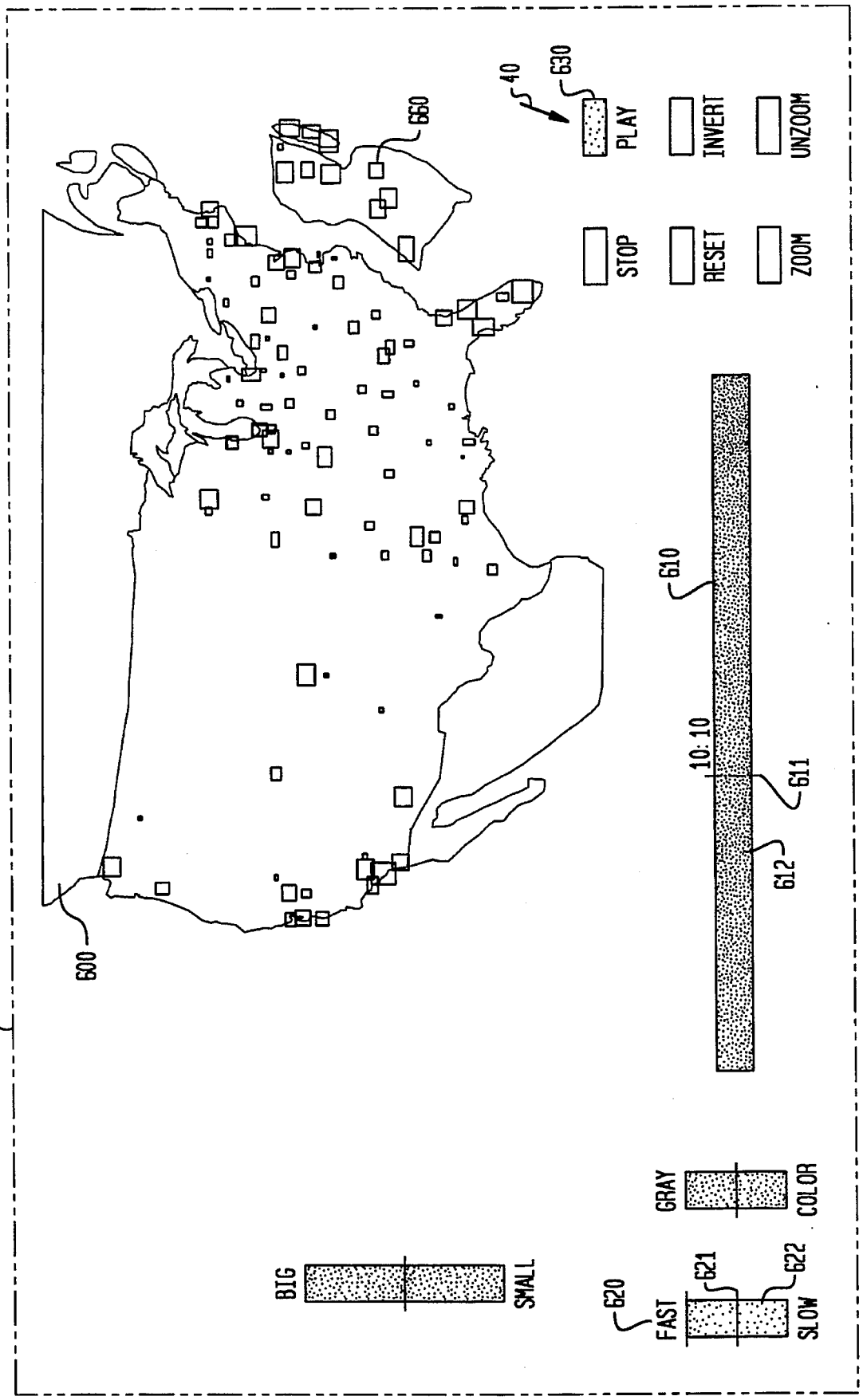

FIG. 9 illustrates slider bar 611 as it automatically passes through the point on time scale 612 representing the time 10:10 o'clock. In passing through that point, computer 10 dynamically changes the size of the displayed symbols to coincide with the level of the statistics accumulated by their respective nodes over the interval defined by 10:05 o'clock through 10:10 o'clock. As slider bar 611 is automatically advanced across time scale 612, computer 10 dynamically changes the size of the symbols to reflect the values of the statistics accumulated by the network nodes over the next interval defined by 10:10 o'clock through 10:15 o'clock, as shown in FIG. 10.

Figure 10:
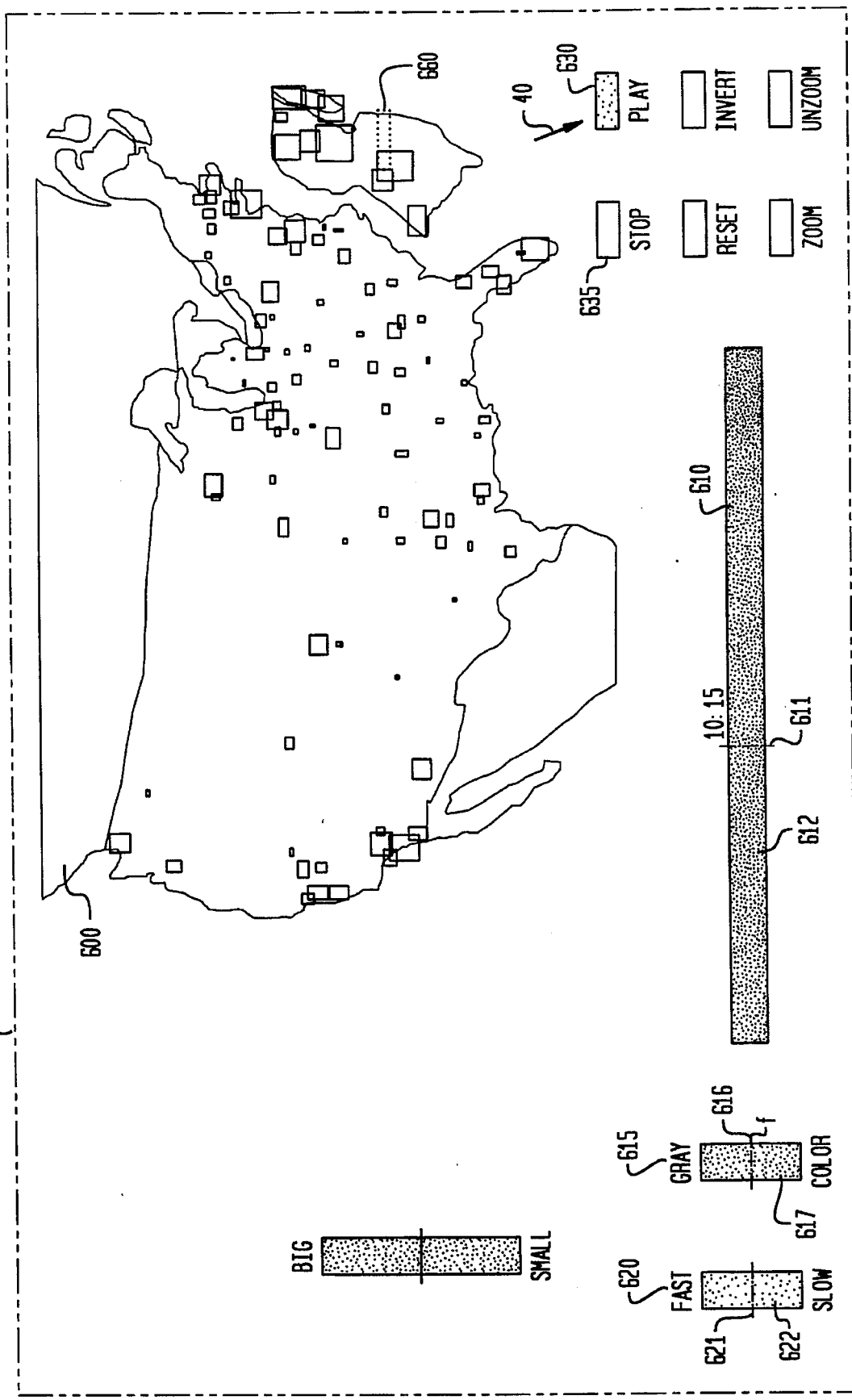

In comparing FIG. 9 with FIG. 10, it is readily seen that as computer 10 plays through time intervals 10:10 and 10:15, an abrupt change occurs in the size and shape of node 660. The change in this case may have been due to a possible network facility problem in the vicinity of node 660.

As mentioned above, the user may adjust the sensitivity of the color coding associated with the displayed symbols by adjusting slider bar 616 along the color scale 617 of color coding tool 615. The user moves slider bar along scale 617 similar to the way that the user moves slider bars 606 and 611 along scales 607 and 612, respectively. As shown in FIG. 10, slider bar 616 is initially positioned at point "f" along scale 607 when map 600 is first brought up on screen 11. That is, slider bar 616 is positioned at a default value, which is approximately at the center of scale 617. Scale 617 is calibrated such that the sensitivity of the color coding of the symbols decreases in the direction toward the top end of scale 617 as identified by the term "Gray" and increases in the direction toward the bottom end of the scale as identified by the term "Color". Therefore, the color coding of the symbols becomes most insensitive (sensitive) to relative differences between the value of incoming and outgoing statistics when the color bar is positioned at the top (bottom) of scale 617. Thus, if the user positions slider bar 616 at the top end of scale 617, then computer 10 paints only those symbols having a substantial difference between the levels of their incoming and outgoing data, either red or green, as the case may be. Otherwise, computer 10 paints a symbol gray, as shown in FIG. 11.

Figure 11:
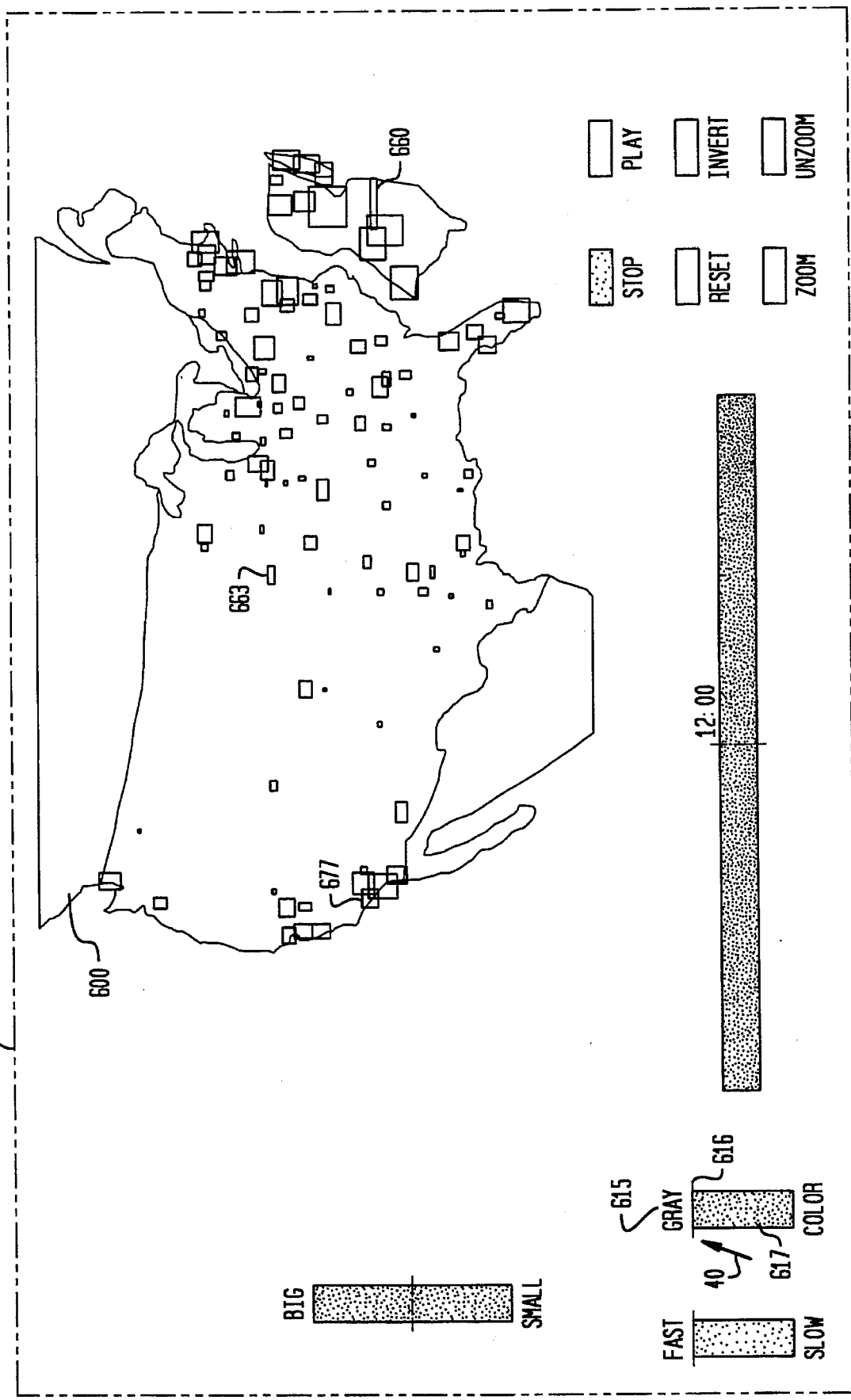

It is seen in FIG. 11, that slider bars 606 and 611 are positioned at their default values. In this sense, FIG. 11 is similar to FIG. 2, except that the user has moved slider bar 616 to the top end of scale 617. Computer 10 responsive thereto redisplays screen 11 of FIG. 2, but now paints the symbols gray (as defined by the solid lines), except for symbol 677 which is still painted red (as defined by the dotted line). Symbol 677 is painted red because the level of its incoming data substantially exceeds the level of its outgoing data (which is virtually zero). In comparing FIG. 2 with FIG. 11, it is also seen that the color of nodes 660 and 663 has been changed to gray.

Figure 12:
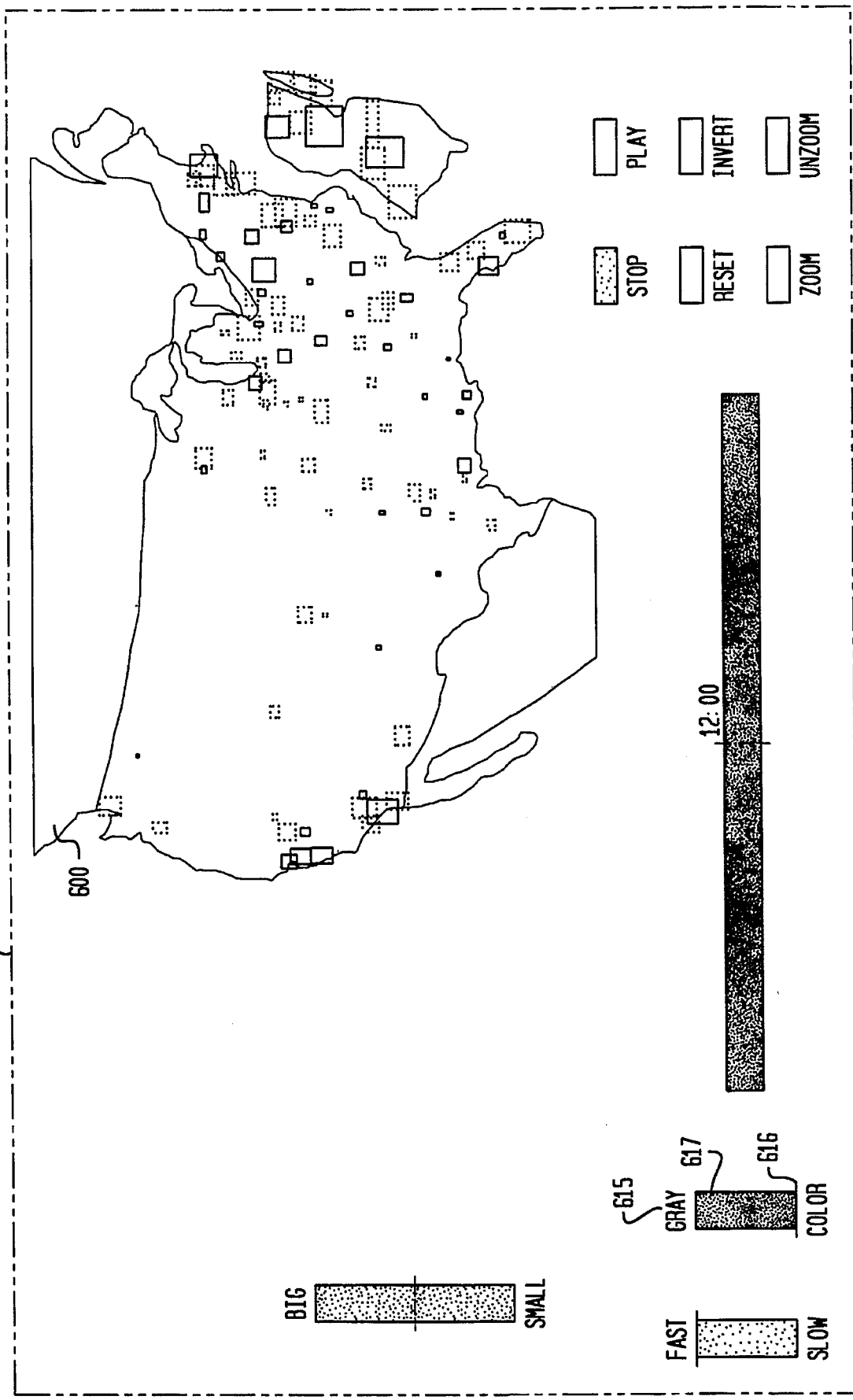

If the user moves slider bar 616 in the opposite direction toward the bottom end of scale 617, then the sensitivity of the color coding will have the opposite effect, i.e., the color coding will be most sensitive to almost any difference between the levels of incoming and outgoing data, as mentioned above and as shown in FIG. 12.

Figure 13:
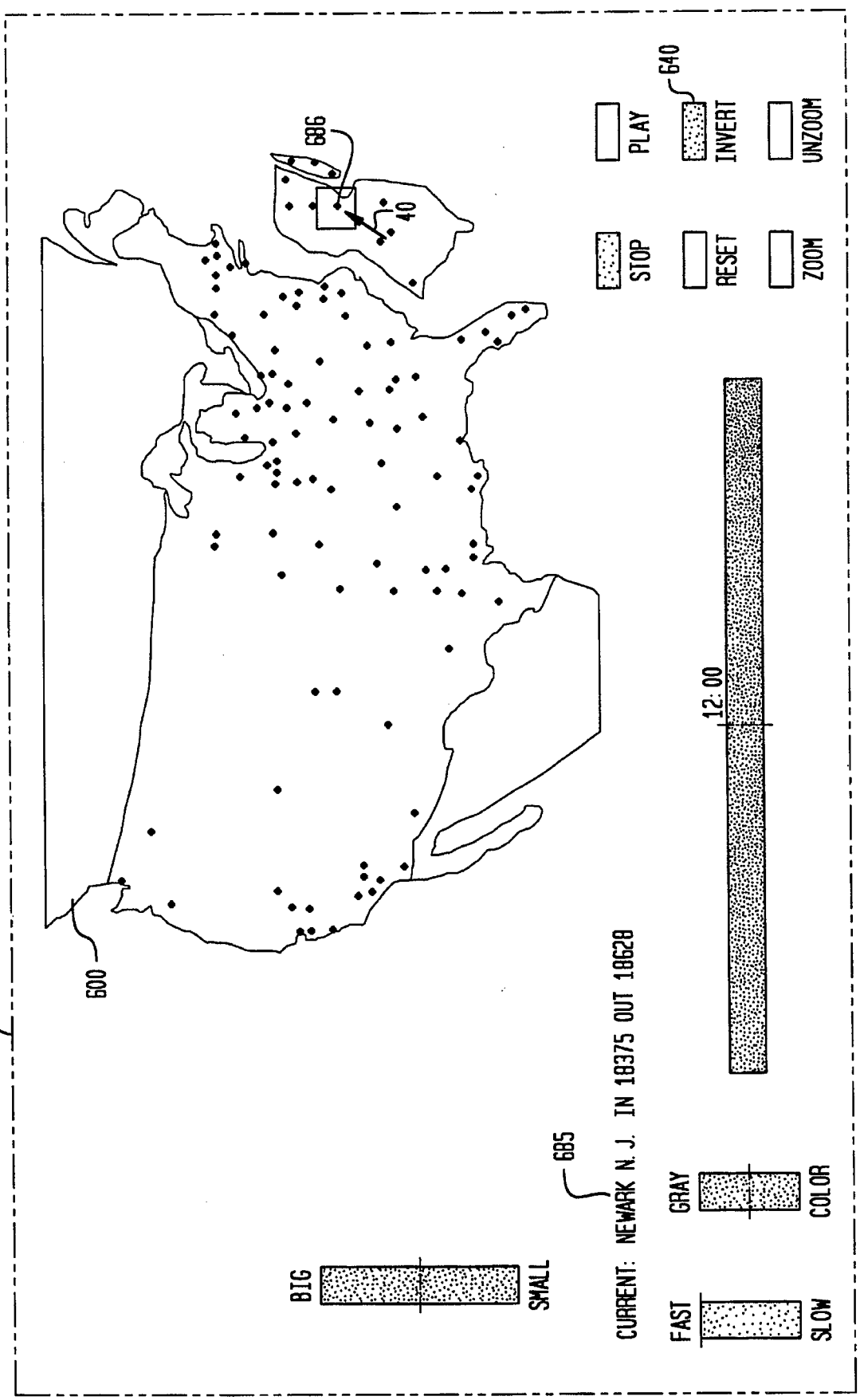

As mentioned above, the user may deactivate all nodes by pointing to "Invert" tool 640 while operating mouse button 14a. When the user does so, computer 10 replaces each of the displayed symbols with a somewhat diamond shaped symbol, as shown in FIG. 13. It is seen from the FIG. that after deactivating the nodes, the user has positioned cursor 40 within the vicinity of symbol 686 while operating mouse button 14c. As a result of the latter action, computer 10 designates (flags) symbol 686 as being the anchor symbol and displays the identity (Newark, N.J.) of the node as well as the values of the statistics accumulated by the identified node over the relevant interval, as shown at 685. Moveover, computer 10 will continue to display that information even though the user decides to move cursor 40 to some other point on screen 11.

As was mentioned above, the user may employ one or more of the other aforementioned tools to fully expose symbol 677. For example, the user may employ cursor 40 as a brush to deactivate the nodes that are in close proximity to symbol 677. The user deactivates a node in this manner by pointing to the node while operating mouse button 14b, and may reverse this effect by "brushing" over the deactivated node while operating the mouse button 14a.

Figure 14:
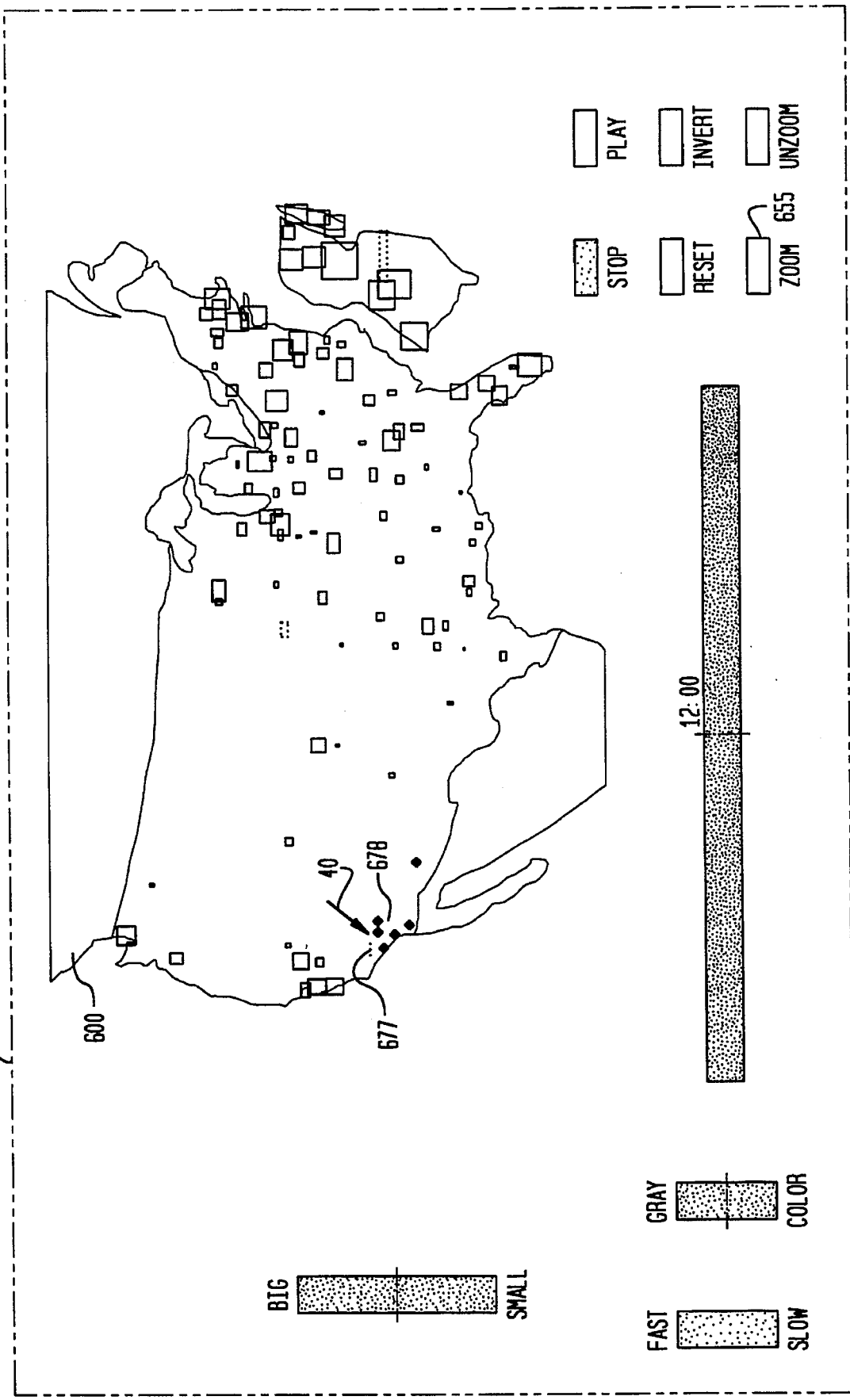

Turning then to FIG. 14, there is shown the result of the user deactivating the nodes that are in close proximity to node 677 so as to fully expose the latter node. (The deactivated nodes are collectively designated 678.)

As mentioned above, the user may magnify a particular area of map 600 that may be of interest to the user. For example, the user may magnify the area surrounding node 677 using mouse cursor 40 in the manner described above. That is, the user (a) points to Zoom tool 655 while operating mouse button 14a, and (b) then outlines the area of map 600 to be magnified, in the manner discussed above. When the user does so, computer 10 erases screen 11 and then displays a magnified version of the area outlined by the user, as shown in FIG. 15.

Figure 15:
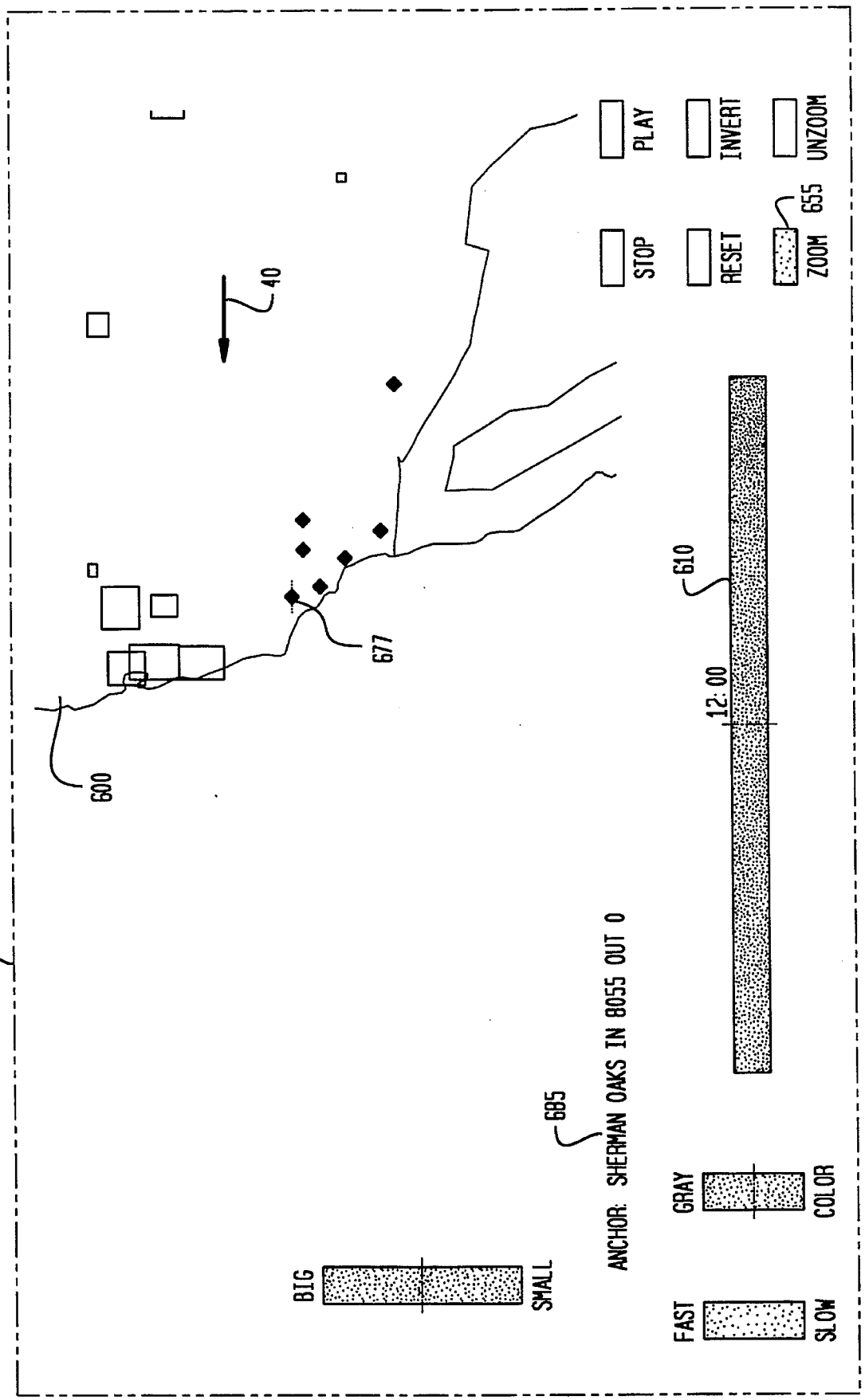
Figure 17:
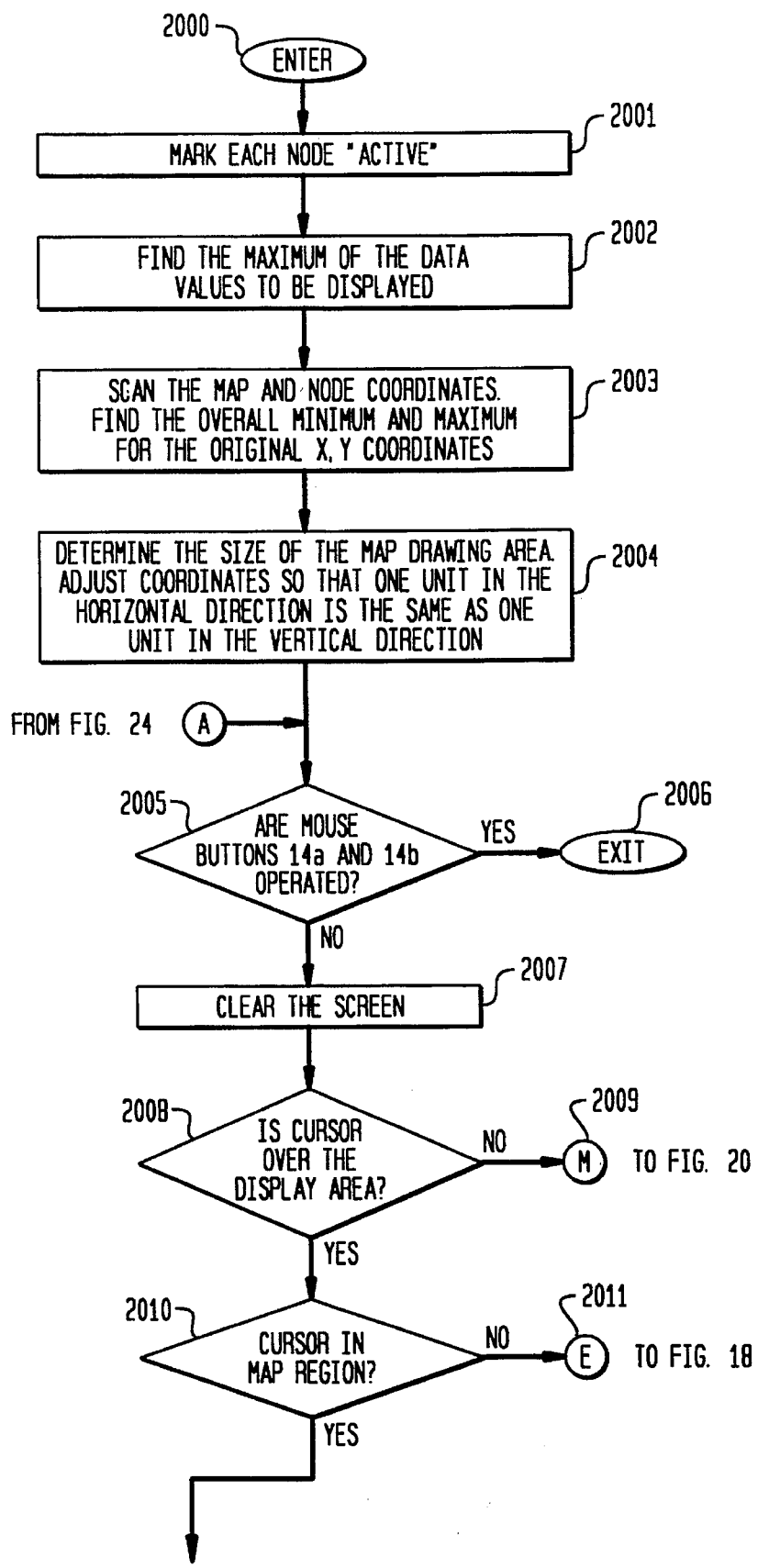
Figure 18:
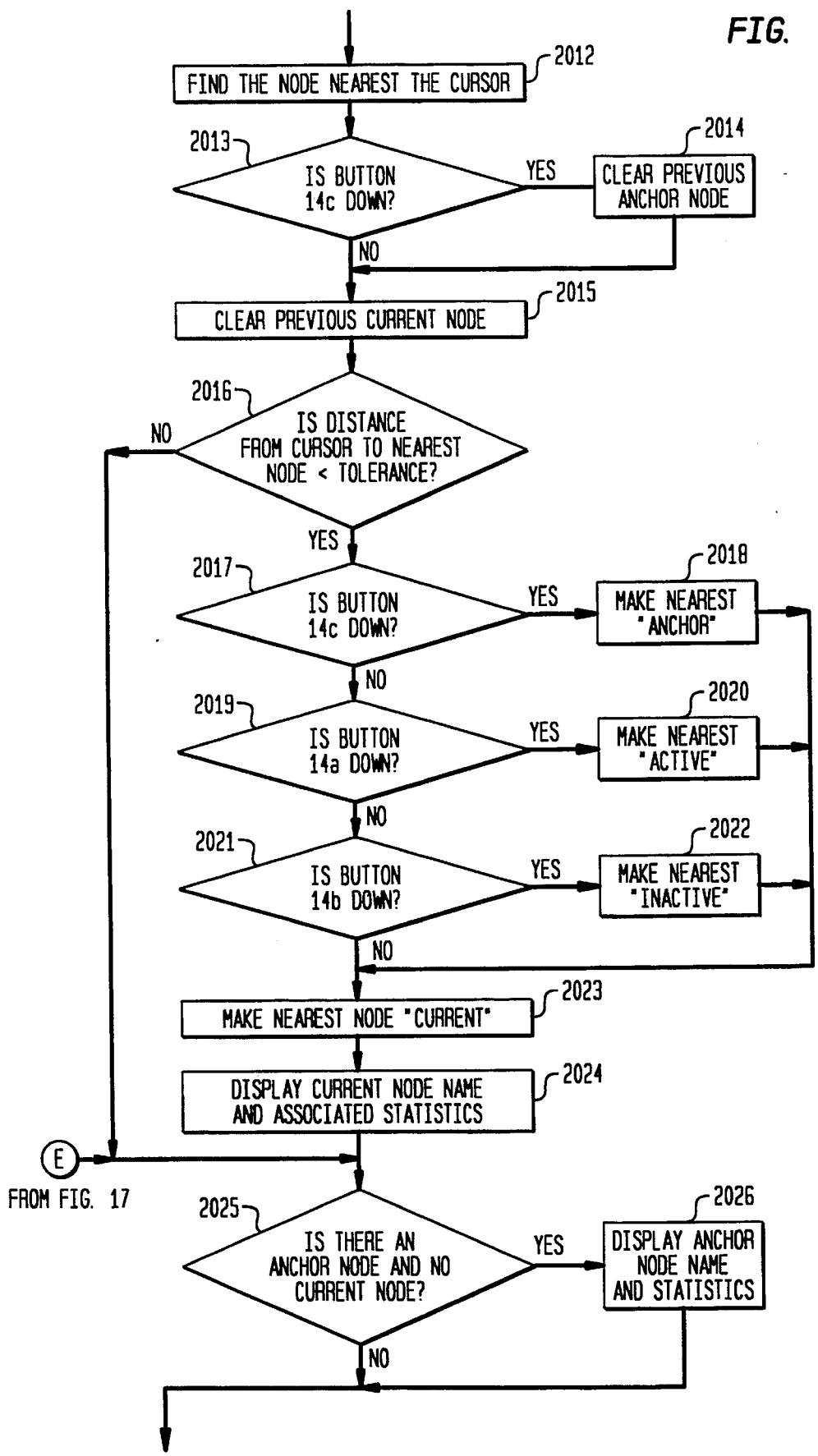
Figure 19:
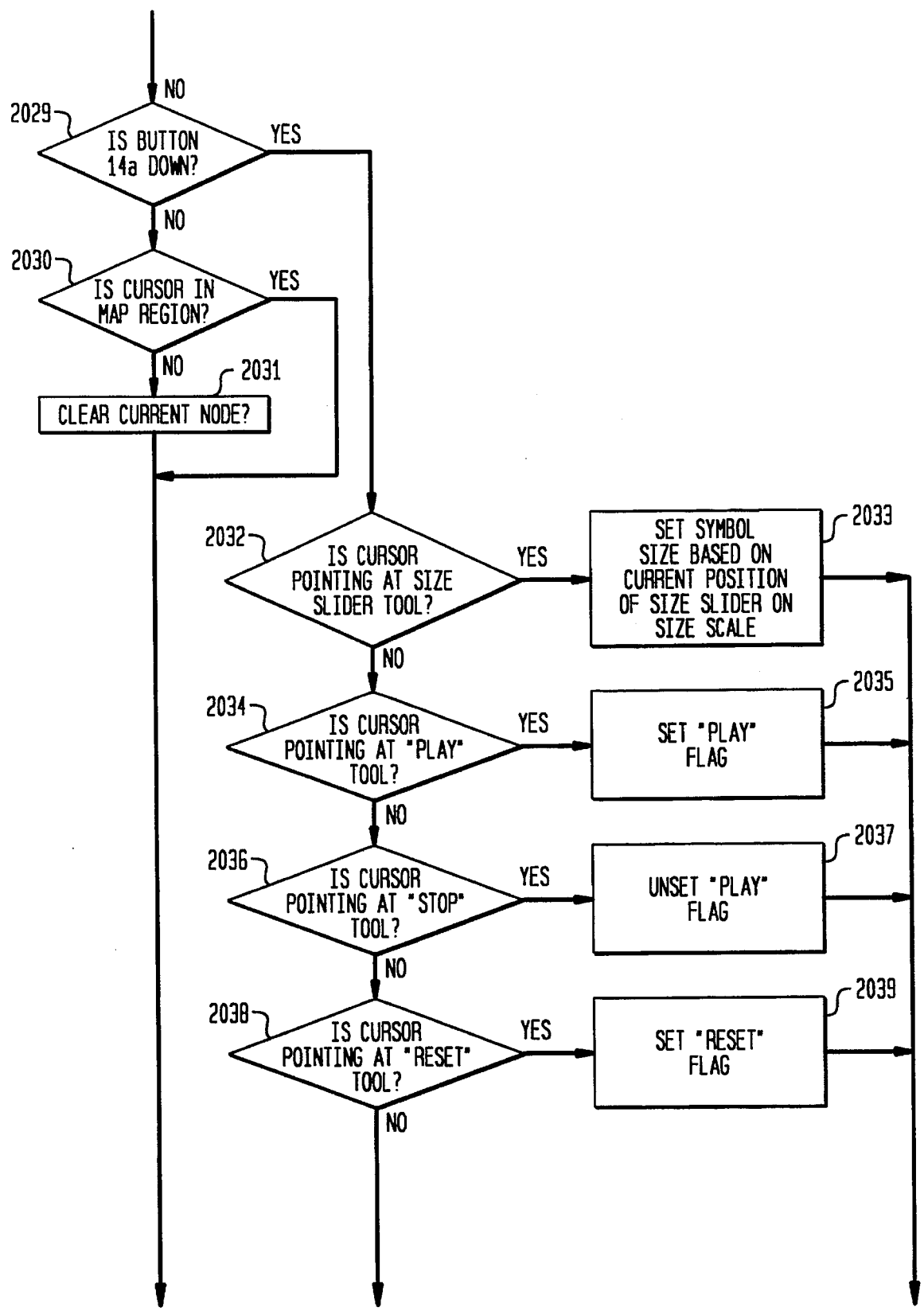
Figure 20:
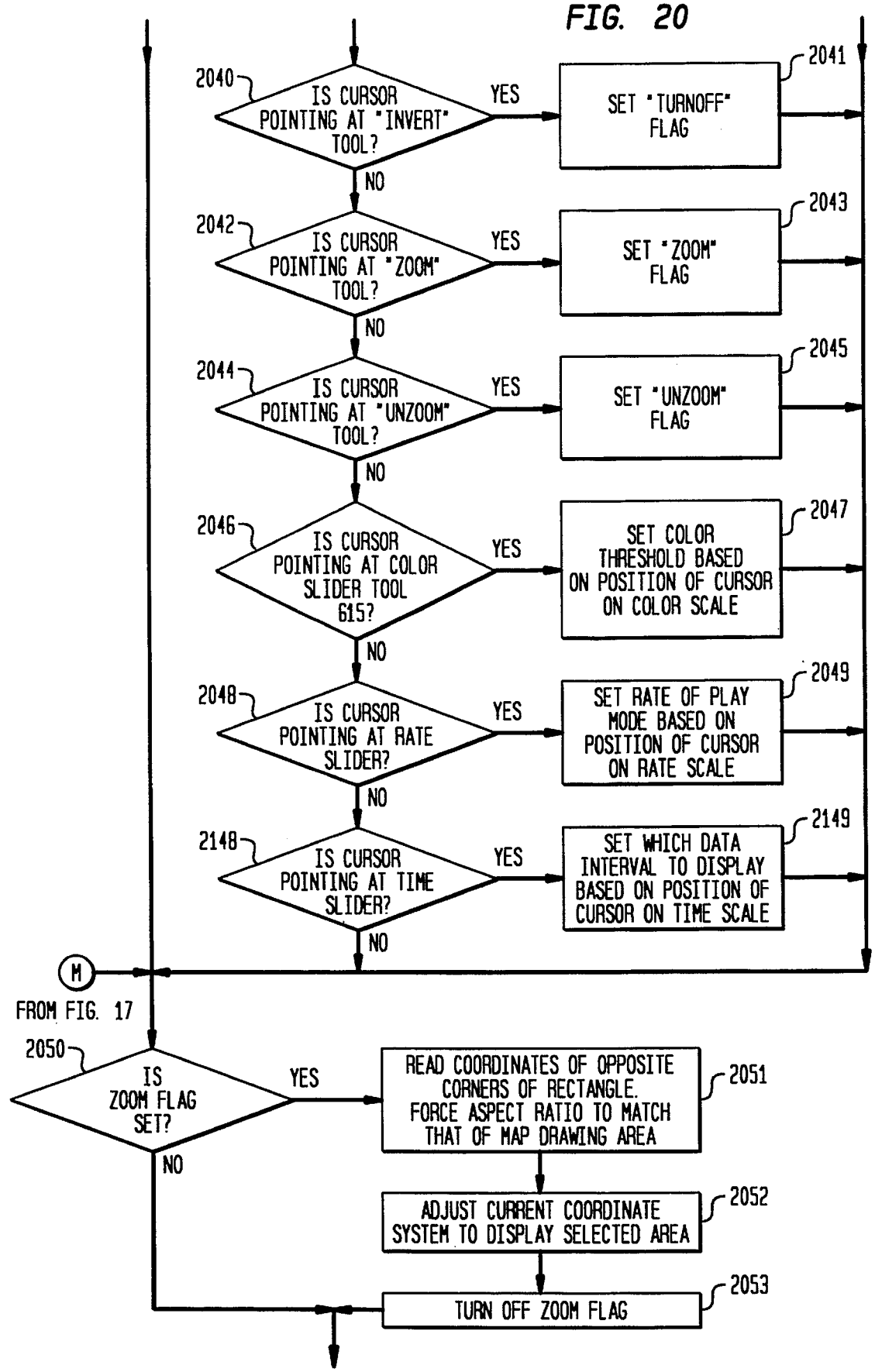
Figure 21:
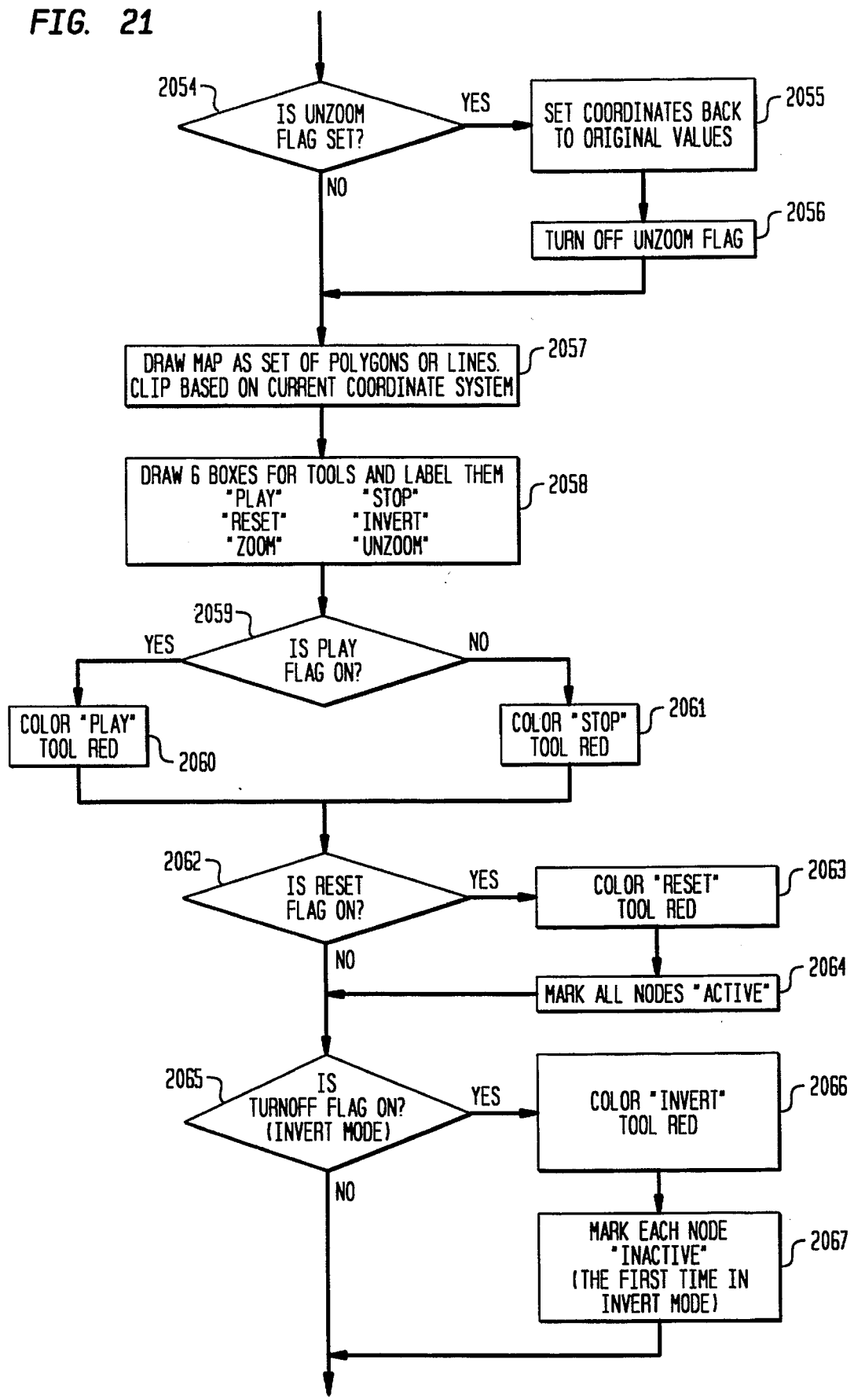
Figure 22:
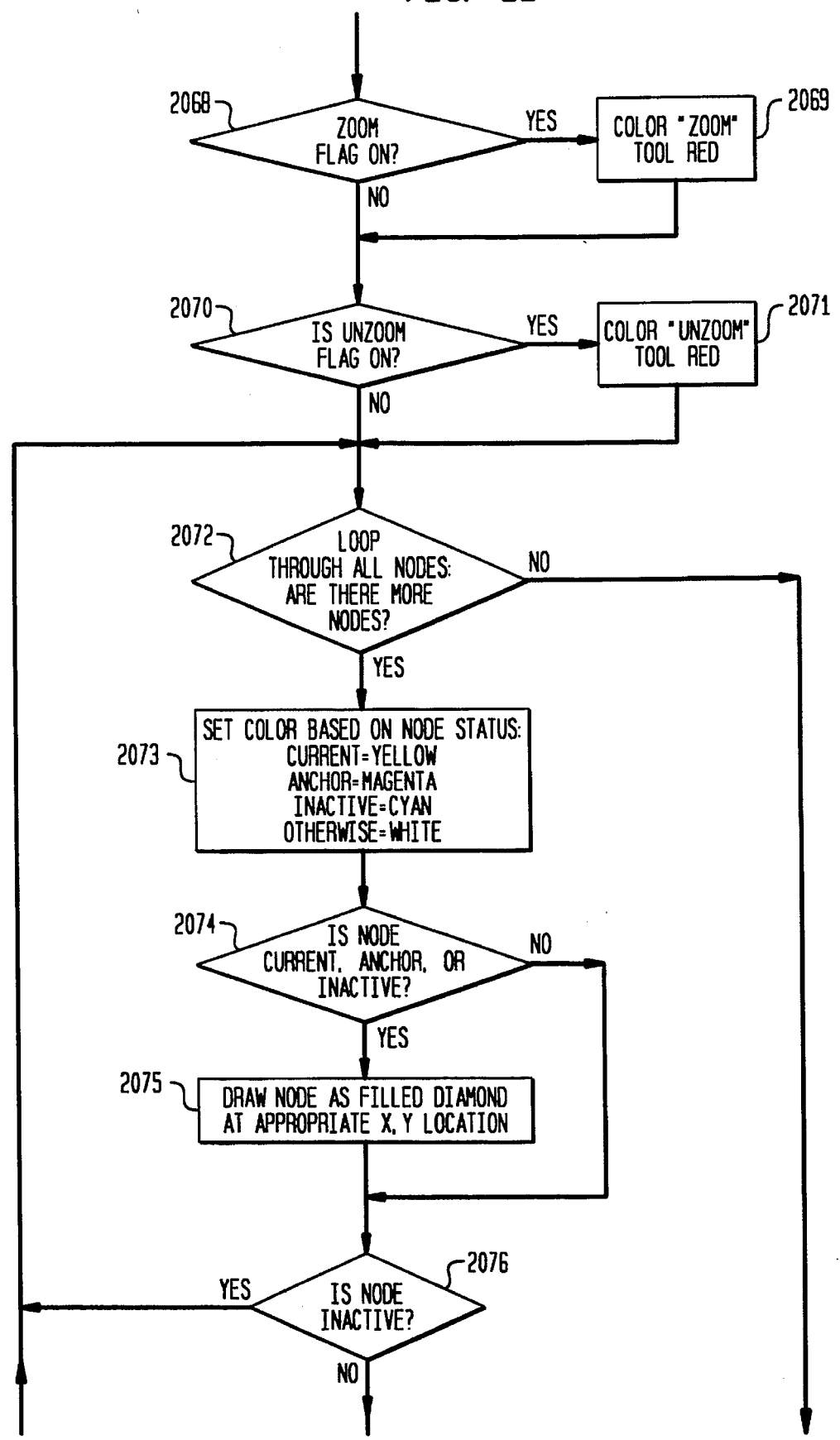
Figure 23:
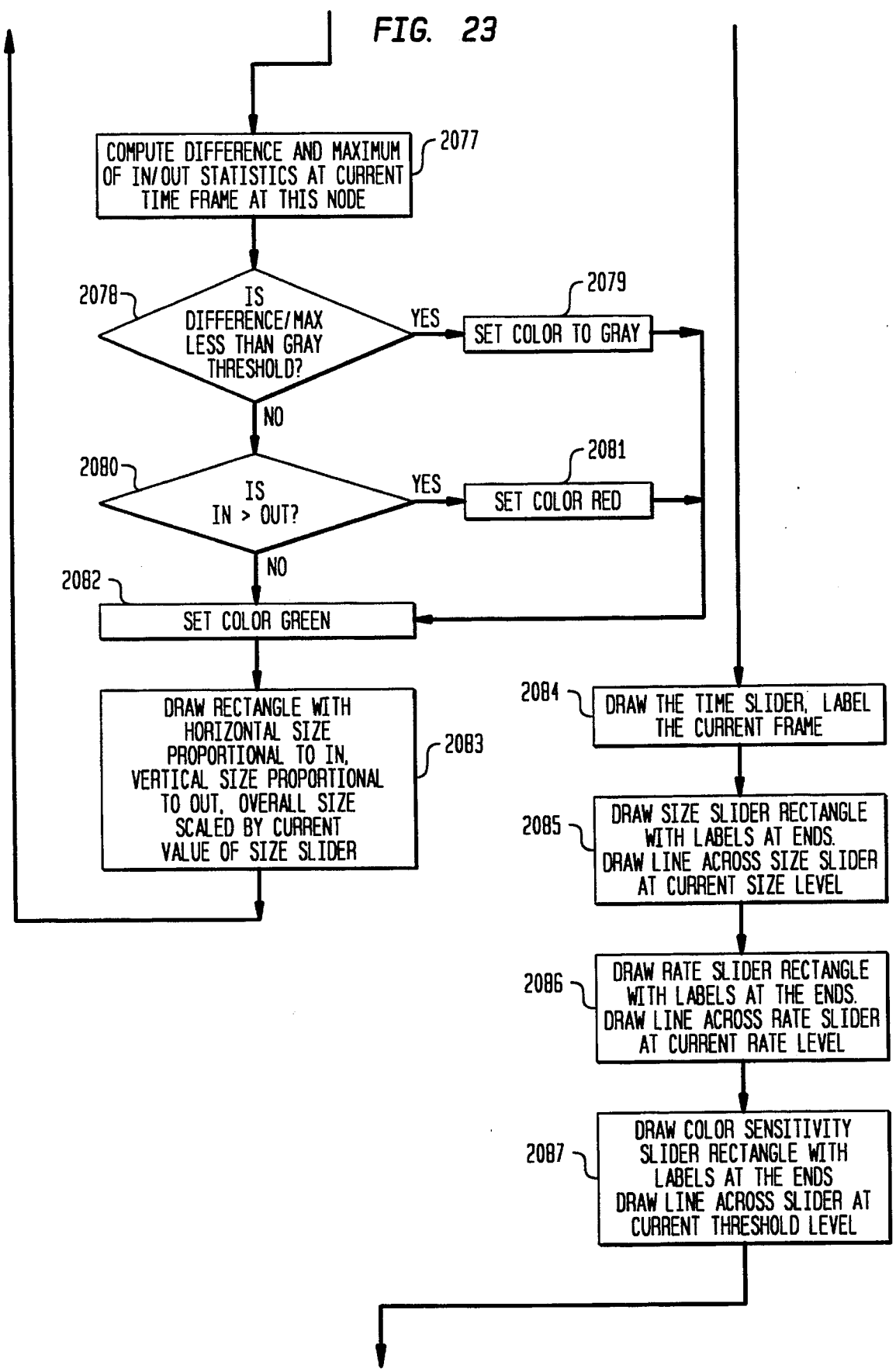

It seen from FIG. 15, that computer 10 has also displayed the identity (Sherman Oaks, Calif.) as well as the statistics associated with node 677. Computer 10 displays that information as a result of the user having designated that symbol as the anchor node, as indicated by the first word of information displayed at 685. (It is noted that node 677 retains that designation even though the user may move mouse cursor 40 out of the vicinity of symbol 677, as mentioned above.)

We now turn to a discussion of the software program which implements our invention in computer 10.

Turning then to FIGS. 17 through 24, which should be arranged as shown in FIG. 16, the program is entered at block 2000 where it proceeds to block 2001. At block 2001, the program uses a collection of storage elements, one for each node, to record the status of each node, marking each one of the nodes "active". The program then proceeds to block 2002 where it scans through the data values associated with each node and finds the maximum of these values. The display may be achieved with various maps and locations of the nodes in which a map is drawn by a series of straight line segments displayed on screen 11, and in which each segment is determined by the x (horizontal) and y (vertical) coordinates of its end points. At block 2003, the program finds the overall minimum and maximum values of the aforementioned coordinates to set the boundary for map 600.

The program then proceeds to block 2004 where it ensures that the map, when drawn on the screen, has the appropriate aspect ratio. (The map coordinates are assumed to be commensurate with each other, meaning one unit in the x direction should occupy the same length on the display as one unit in the y direction.)

At block 2005, the program begins the main loop. Specifically, if the program finds that buttons 14a and 14b are both depressed at the same time, then the program exits at block 2006. Otherwise, the program proceeds to block 2007, where it dears the display screen. In an illustrative embodiment of the invention, the display is "double buffered", meaning that two copies of the screen image are maintained. A so-called "front" copy is displayed on the screen while a second, or "back", copy is "manipulated" in memory. When the back copy has been completely drawn, the computer interchanges the front and back copies, making the former back copy visible (block 2003) and making it appear to the user as an instantaneous change in the display.

At block 2008, the program determines whether cursor 40 is pointing at the region of screen 11 that is displaying the map or tools and proceeds to block 2010 if it finds that to be the case. Otherwise, it proceeds to block 2050 via block 2009 to avoid performing the more specific tests of determining the position of cursor 40.

At block 2010, the program determines whether cursor 40 is in the rectangular region that is displaying the map and proceeds to block 2012 if it finds that to be the ease. Otherwise, control is passed to block 2025 via block 2011, thereby avoiding all tests concerned with determining the proximity of the cursor to nodes on the map.

At block 2012, the program compares the distance from cursor 40 to all nodes on the map to determine which of the nodes is nearest to cursor 40. The program then proceeds to block 2013.

Blocks 2013 and 2014 represent a routine in which the program eliminates any previous anchor node if button 14c is depressed. At block 2015, the program eliminates the previous current node.

If the program finds that the distance from the cursor to the nearest node is greater than some predetermined tolerance (for example, 0.5 inches), then the program proceeds from 2016 to block 2025. Otherwise, the program executes blocks 2017 through 2022, in which the state of buttons 14a, 14b, and 14c is interrogated to determine if the nearest node should be marked as the current anchor or current node, or is to be made active or inactive.

At blocks 2023 and 2024, the program marks the nearest node as being the current node and displays the identity of that node in the manner shown above. At block 2025, the program determines if there is an anchor node (which would have been set in some prior execution of block 2018) and no current node. The program proceeds to block 2026 if it finds that to be the case to display the identity of the anchor node and the values of statistics associated with the anchor node.

At block 2029, the program determines if button 14a is depressed. If it is, the user may be trying to manipulate one of the tools. Accordingly, the program proceeds to execute blocks 2032 through 2049 and blocks 2148 and 2149 to determine the function it should perform. Otherwise, the program proceeds to block 2030 where it checks to see if cursor 40 has been moved out of the displayed rectangular map region. If the program finds this to be the case, then it proceeds to block 2031 where it eliminates any previous current node.

At block 2032, the program tests to see if cursor 40 is pointing at tool 605, and if so, proceeds to block 2033 to set the overall symbol size based on the position the cursor is along the "size" scale 607, that is, the position of cursor 40 vertically up the slider (from 0 if the cursor is at the bottom to 1 if the cursor is at the top).

Blocks 2034 through 2045 represent a routine which checks the position of cursor 40 to see if it is pointing at one of the 6 tools 630, 635, 640, 645, 650, or 655. If the program finds that cursor 40 is pointing to one of these tools, then the program sets a respective flag indicative of that fact. The program thereafter tests the states of the flags to control the drawing of map 600 on screen 11.

Blocks 2046 and 2047 represent a routine which deals with tool 615. That is, if the program finds that cursor 40 is pointing at the color tool 615, then it sets the color threshold based on the position of the cursor on the color scale 617.

Blocks 2048 and 2049 represent a routine which deals with tool 620. That is, if the program finds that cursor 40 is pointing at the rate tool 620, then it sets the rate of play based on the position of the cursor on the rate scale 622.

Blocks 2148 and 2149 represent a routine which deals with tool 610. That is, if the program finds that cursor 40 is pointing at the time slider tool 610, then it determines which data interval to display based on the position of the cursor on time scale 612.

At block 2050, the program tests the state of the "zoom" flag that may have been set in block 2043. If the program finds that the flag was set, then at block 2051 the user must (a) position cursor 40 at some point on the map display, (b) depress button 14a, (c) move to another position on map 600, and (d) release button 14a. The program uses the two positions to determine the location of each of the two opposite corners of a rectangle that will be magnified to fill the region of the screen that is occupied by map 600. Once again, the software ensures that the distance occupied by one unit in the x direction is identical to that occupied by one unit in the y direction.

At block 2052 the program sets the lower and upper coordinate limits for the map region so that only the selected portion of the map is displayed. (It is noted that on many computer systems, the system graphics software or hardware will automatically clip (suppress) any graphics that are drawn outside of this specified set of limits.)

At block 2053, the program turns off the "zoom" flag.

At block 2054, the program determines if the "unzoom" flag is set (the program sets the "unzoom" flag in block 2045). If the program finds the "unzoom" flag set, then, at blocks 2055 and 2056, the program resets the coordinate limits of the map to their original values as determined at block 2003 and then resets the "unzoom" flag. '

At block 2057, the program draws the map by drawing a series of connected line segments or filled polygons, clipping any lines or polygons outside of the coordinate limits, and then proceeds to block 2058 where it draws and labels the boxes for tools 630, 635, 640, 645, 650 and 655.

At block 2059, the program tests the state of the "play" flag (which may have been set at either block 2035 or 2037). The program at blocks 2060 or 2061 colors the appropriate tool 630 or 635 red based on the state of the "play" flag. The program then proceeds to block 2062 where it checks to see if the "reset" flag is set (the "reset" flag may have been set in block 2039). If the program finds that the "reset" flag is set, then it proceeds to block 2063 where it colors tool 645 red. The program then proceeds to block 2064 to mark all nodes active, as was done at block 2001.

The program at block 2065 tests to see if the "turnoff" flag is set (as would be the case at block 2041). If the program finds that flag set, then it proceeds to block 2066 where it colors tool 640 red. The program then proceeds to block 2067 where it scans through all nodes and marks each node inactive. (The program performs this latter action only for the first time that the "turnoff" flag is set and will only perform the action once again if the "turnoff" flag has been reset.)

Blocks 2068 through 2071 represent a routine which tests the "zoom" and "unzoom" flags and which colors tools 650 and 655 if appropriate.

The program at block 2072 starts a loop through all displayed nodes. When all of the displayed nodes have been processed, the program proceeds to block 2084.

Specifically, at block 2073, the program sets the color based upon the status of the node being processed. At block 2074, the program tests the node status and if it is found to be anchor, current, or inactive, then, at block 2075, the program draws the node as an appropriately colored filled diamond.

At block 2076, the program determines if the node is inactive, and if so, the symbol for the node is not drawn and control of the program is returned to block 2072. Otherwise, control passes to block 2077, where the program computes the difference, "diff", between the incoming and outgoing statistics as well as the larger of the incoming and outgoing statistics, "max", at the present node at the current time frame.

At block 2078, the program determines if the quotient "diff"/"max" is larger than the color threshold set in block 2047. If so, the color is set to red in block 2081 if the incoming statistic is the larger and to green in block 2082 if the outgoing statistic is the larger. If the quotient is smaller than the color threshold, then the color is set to gray in block 2079.

At block 2083, the program draws a rectangle centered at the present node. The horizontal size of the rectangle is proportional to the value of the incoming statistic, the vertical size is proportional to the value of the outgoing statistic, and both sizes are scaled by the current value of the size slider (which may have been set in block 2033). The program then returns to block 2072 to process the next node.

Blocks 2084 through 2087 form a routine to draw slider tools 605, 610, 615, and 620. At block 2084, time slider tool 610 is drawn and slider bar 611 is drawn at the current time interval and labeled. At block 2085, size slider tool 605 is drawn, its ends are labelled, and bar 606 is drawn across it at the current size level. At block 2086, rate slider tool 620 is drawn, its ends are labelled, and bar 621 is drawn across it at the current rate level. At block 2087, color slider tool 615 is drawn, its ends are labelled, and bar 616 is drawn across it at the current threshold level.

At block 2088, the program tests the "play" flag, and if it is not set, then the program transfers control to block 2093. Otherwise, the program executes blocks 2089 through 2092. At block 2089, the program increments a counter that records the number of times that the data for the present time interval have been presented. At block 2090, the program determines a threshold for the count based on the rate slider. The fastest rate sets the threshold to 1, while the slowest rate sets the threshold to 20. The program tests the counter against the threshold in block 2091, and if the counter exceeds the threshold, then the program executes block 2092, where the displayed time interval is advanced by one unit and the counter is reset to zero. The program then proceeds to block 2093 where it makes the current "picture" visible by interchanging the front and back buffers, as discussed above.

The program then proceeds to block 2094 where it returns to block 2005, thereby completing one cycle of the main drawing loop.

The foregoing is merely illustrative of the principles of our invention. Those skilled in the art will be able to devise numerous arrangements, which, although not explicitly shown or described herein, nevertheless, embody those principles that are within its spirit and scope. For example, in the arrangement illustrated in FIG. 1, computer 10 could be readily arranged to perform the function of data management system 30. In this way, computer 10 would obtain the data directly from the nodes themselves. Alternatively, the user could load the data directly into computer 10, thereby eliminating the need for a data management system. Moreover, the shape of the symbols could be drawn using virtually any type of pattern in place of the rectangular pattern discussed herein. For example, the symbols could be some other geometric figure, such as a circle, in which the diameter of the circle is changed in accordance with the time-varying data. Further, line styles could be used in place of colors, such as, for example, dotted and dashed lines and combinations thereof. In addition, our arrangement could be employed in analyzing other types of data, such as, for example, non-directional data, which may or may not be varying over time. Further, time tool 610 could be arranged so that the user could advance slider 611 to "jump to" any point on scale 612, without passing through intermediate points.

We claim:

1. A dynamic graphics arrangement for use in a computer having a display, said display being employed to display data occurring at respective points in time, said arrangement comprising means responsive to receipt of a predetermined request inputted by a user of said computer for displaying on said display a plurality of multidimensional symbols representing respective nodes, said dimensions being indicative of the levels of respective data associated with its respective one of said nodes at a particular point in time, and means for displaying on said display a tool representing individual points in time at which said data occurred and, responsive to said user interacting with said tool so as to cause said tool to move to an individual one of said points, for adjusting the dimensions of each of said symbols so that said dimensions represent the levels of said associated data that occurred at the point in time represented by the current position of said displayed tool.

2. A dynamic graphics arrangement for use in a computer having a display comprising means for storing time-varying data associated with respective ones of a plurality of nodes, means responsive to receipt of a predetermined request inputted by a user of said computer for displaying on said display a plurality of multidimensional symbols representing respective ones of said nodes, the dimensions of each of said symbols being indicative of the levels of data associated with its respective one of said nodes, means for displaying on said display a tool calibrated so that it represents respective points in time at which said data occurred, and means, responsive to a user of said computer interacting with said displayed tool so as to cause said tool to move through said respective points in time, for dynamically adjusting the dimensions of each of said displayed symbols so that they reflect graphically the levels of the data that occurred at their associated nodes at a point in time represented by the current position of said displayed tool.

3. The graphics arrangement set forth in claim 2 wherein each of said nodes has a predefined identity and wherein said means for displaying includes means responsive to said user pointing to one of said symbols so as to mark that symbol as an anchor symbol for displaying the identity of the respective one of said nodes represented by said one symbol as well as the values of the data associated with that node.

4. The graphics arrangement set forth in claim 3 wherein said means for displaying further includes means responsive to said user pointing to another one of said symbols so as to mark that symbol as being a current symbol for displaying with the identity of said anchor symbol the identity of the respective one of said nodes represented by said current symbol as well as the values of the data associated with the nodes represented by said anchor and current symbols.

5. The graphics arrangement set forth in claim 2 wherein said arrangement further comprises means for displaying a plurality of tools such that said user may interact with each of said plurality of tools in order to control the display of said time-varying data and said symbols.

6. The graphics arrangement set forth in claim 5 wherein said plurality of tools includes a tool operative by said user and representing a predetermined sequence of successive intervals of time, and wherein said arrangement further comprises means responsive to said user causing said tool to move through said intervals for dynamically changing the dimensions defining respective ones of said symbols so that said symbols reflect the value of said time-varying data associated with their respective ones of said nodes for the current one of said intervals.

7. A dynamic graphics arrangement for use in a computer having a display comprising means for storing time-varying data associated with respective ones of a plurality of nodes, means responsive to receipt of a predetermined request inputted by a user of said computer for displaying on said display a plurality of non-numeric symbols representing respective ones of said nodes, each of said symbols being defined by first and second variables indicative of the levels of data associated with its respective one of said nodes, means for displaying on said display a tool calibrated so that it represents respective points in time at which said data occurred, and means, responsive to a user of said computer interacting with said displayed tool so as to cause said tool to move through said respective points in time, for dynamically adjusting the first and second variables of each of said displayed symbols so that they reflect graphically the levels of the data that occurred at their associated nodes at a point in time represented by the current position of said displayed tool, wherein each of said displayed symbols is a rectangle and wherein said first and second variables respectively define the height and width of the associated rectangle.

8. A dynamic graphics arrangement for use in a computer having a display comprising means for storing time-varying data associated with respective ones of a plurality of nodes, means responsive to receipt of a predetermined request inputted by a user of said computer for displaying on said display a plurality of symbols representing respective ones of said nodes, each of said symbols being defined by first and second variables indicative of the levels of data associated with its respective one of said nodes, means for displaying on said display a tool calibrated so that it represents respective points in time at which said data occurred, means, responsive to a user of said computer interacting with said displayed tool so as to cause said tool to move through said respective points in time, for dynamically adjusting the first and second variables of each of said displayed symbols so that they reflect graphically the levels of the data that occurred at their associated nodes at a point in time represented by the current position of said displayed tool, wherein each of said displayed symbols is a rectangle and said first and second variables respectively define the height and width of the associated symbol, and means for displaying at least one of said symbols in a first color when the length of its respective width exceeds the length of its respective height by more than a predetermined percentage and for displaying said at least one of said symbols in a second color when the length of its respective height exceeds the length of its respective width by more than said predetermined percentage.

9. The graphics arrangement set forth in claim 8 further comprising means for displaying said at least one of said symbols in a third color when the length of its respective height and width are substantially equal.

10. A dynamic graphics arrangement for use in a computer having a display comprising means for storing time-varying data associated with respective ones of a plurality of nodes, means responsive to receipt of a predetermined request inputted by a user of said computer for displaying on said display a plurality of symbols representing respective ones of said nodes, each of said symbols being defined by first and second variables indicative of the levels of data associated with its respective one of said nodes, means for displaying on said display a tool calibrated so that it represents respective points in time at which said data occurred, means, responsive to a user of said computer interacting with said displayed tool so as to cause said tool to move through said respective points in time, for dynamically adjusting the first and second variables of each of said displayed symbols so that they reflect graphically the levels of the data that occurred at their associated nodes at a point in time represented by the current position of said displayed tool, wherein each of said displayed symbols is a rectangle and wherein said first and second variables respectively define the height and width of the associated rectangle, and means for displaying said symbols in one of a number of predetermined colors as a function of the lengths of their respective heights and widths.

11. A dynamic graphics arrangement for use in a computer having a display comprising means for storing time-varying data associated with respective ones of a plurality of nodes, means responsive to receipt of a predetermined request inputted by a user of said computer for displaying on said display a plurality of symbols representing respective ones of said nodes, each of said symbols being defined by first and second variables indicative of the levels of data associated with its respective one of said nodes, means for displaying on said display a tool calibrated so that it represents respective points in time at which said data occurred, means, responsive to a user of said computer interacting with said displayed tool so as to cause said tool to move through said respective points in time, for dynamically adjusting the first and second variables of each of said displayed symbols so that they reflect graphically the levels of the data that occurred at their associated nodes at a point in time represented by the current position of said displayed tool, and means for displaying a plurality of tools such that said user may interact with each of said plurality of tools in order to control the display of said time-varying data and said symbols, wherein said plurality of tools includes a tool having a predetermined scale operative by said user for simultaneously and dynamically changing the lengths and widths of said displayed symbols commensurate with the distance that said user moves a slider on said scale.

12. A method of dynamically displaying on a display associated with a computer data occurring at respective points in time, said data being associated with respective ones of a plurality of nodes, said method comprising the steps of responding to receipt of a predetermined request inputted by a user of said computer by displaying on said display a plurality of multidimensional symbols representing respective ones of said nodes, and displaying on said display a tool representing individual points in time at which said data occurred and responding to said user interacting with said displayed tool so as to cause said tool to move through individual ones of said represented points in time by changing the dimensions of each of said symbols in a predetermined manner to reflect the value of said data associated with its respective one of said nodes for the point in time represented by the current position of said displayed tool.

13. A method of dynamically displaying on a display associated with a computer time-varying data associated with a plurality of nodes, said method comprising the steps of responding to receipt of a predetermined request inputted by a user of said computer by displaying on said display a plurality of multidimensional symbols representing respective ones of said nodes, each of said symbols being indicative of the levels of data associated with its respective one of said nodes, displaying on said display a tool calibrated so that it represents respective points in time at which said data occurred, and responding to said user interacting with said displayed tool so as to cause said tool to move through a number of said respective points in time by dynamically adjusting the dimensions of each of said displayed symbols so that they reflect graphically the levels of the data that occurred at their associated nodes at a point in time represented by the current position of said displayed tool.

14. The method set forth in claim 13 wherein said dimensions respectively define the height and width of a rectangle.

15. The method set forth in claim 13 wherein each of said nodes has a predefined identity and wherein said step of adjusting includes the step of responding to said user pointing to one of said symbols by marking that symbol as an anchor symbol and by displaying the identity of the respective one of said nodes represented by said one symbol as well as the values of the time-varying data associated with that node.

16. The method set forth in claim 15 wherein said step of adjusting further includes the step of responding to said user pointing to another one of said symbols by marking that symbol a current symbol and by displaying with the identity of the node represented by said anchor symbol the identity of the node represented by said current symbol as well as the values of the data associated with said anchor and current symbols.

17. The method set forth in claim 13 further comprising the step of displaying a plurality of tools such that said user may interact with each of said tools in order to control the display of said time-varying data and said symbols.

18. A method of dynamically displaying on a display associated with a computer time-varying data associated with a plurality of nodes, said method comprising the steps of responding to receipt of a predetermined request inputted by a user of said computer by displaying on said display a plurality of symbols representing respective ones of said nodes, each of said symbols being defined by at least first and second variables indicative of the levels of data associated with its respective one of said nodes, displaying on said display a tool calibrated so that it represents respective points in time at which said data occurred, and responding to said user interacting with said displayed tool so as to cause said tool to move through a number of said respective points in time by dynamically adjusting the first and second variables of each of said displayed symbols so that they reflect graphically the levels of the data that occurred at their associated nodes at a point in time represented by the current position of said displayed tool, and wherein said first and second variables respectively define the height and width of a rectangle, and adjusting the height and width of each of said displayed symbols commensurate with the levels of time-varying data occurring at their respective nodes at a particular point in time.

19. The method set forth in claim 18 further comprising the step of displaying at least one of said symbols in a first color when the length of its respective width exceeds the length of its respective height by a predetermined percentage and displaying said one symbol in a second color when the length of its respective height exceeds the length of its respective width by said predetermined percentage.

20. The method set forth in claim 19 further comprising the step of displaying at least one of said symbols in a third color when the lengths of its height and width are substantially equal to one another.

21. A method of dynamically displaying on a display associated with a computer time-varying data associated with a plurality of nodes, said method comprising the steps of responding to receipt of a predetermined request inputted by a user of said computer by displaying on said display a plurality of symbols representing respective ones of said nodes, each of said symbols being defined by at least first and second variables indicative of the levels of data associated with its respective one of said nodes, displaying on said display a tool calibrated so that it represents respective points in time at which said data occurred, responding to said user interacting with said displayed tool so as to cause said tool to move through a number of said respective points in time by dynamically adjusting the first and second variables of each of said displayed symbols so that they reflect graphically the levels of the data that occurred at their associated nodes at a point in time represented by the current position of said displayed tool, and wherein said first and second variables respectively define the height and width of a rectangle, and displaying said symbols in one of a number of predetermined colors as a function of the lengths of their respective heights and widths.

22. A method of dynamically displaying on a display associated with a computer time-varying data associated with a plurality of nodes, said method comprising the steps of responding to receipt of a predetermined request inputted by a user of said computer by displaying on said display a plurality of symbols representing respective ones of said nodes, each of said symbols being defined by at least first and second variables indicative of the levels of data associated with its respective one of said nodes, displaying on said display a tool calibrated so that it represents respective points in time at which said data occurred, responding to said user interacting with said displayed tool so as to cause said tool to move through a number of said respective points in time by dynamically adjusting the first and second variables of each of said displayed symbols so that they reflect graphically the levels of the data that occurred at their associated nodes at a point in time represented by the current position of said displayed tool displaying a plurality of tools such that said user may interact with each of said tools in order to control the display of said time-varying data and said symbols, and displaying as one of said tools a tool having a predetermined scale operative by said user for dynamically changing the size of said displayed symbols commensurate with the distance that said user moves a slider on said scale.

23. The method set forth in claim 22 further comprising the step of displaying as one of said tools another tool representing a predetermined sequence of successive intervals of time, and wherein said method further comprises the step of responding to said user causing said other tool to move through said intervals by dynamically changing the first and second variables defining respective ones of said symbols so that they reflect the value of said time-varying data associated with their respective ones of said nodes for the current one of said intervals.

* * * * *